US012592830B2

(12) United States Patent
Park et al.

(10) Patent No.: US 12,592,830 B2
(45) Date of Patent: Mar. 31, 2026

(54) METHOD, APPARATUS, AND SYSTEM FOR POST-QUANTUM ELECTRONIC SIGNATURE BASED ON INFINITE HASH FUNCTION

(71) Applicant: Industry-Academic Cooperation Foundation, Dankook University, Yongin-si (KR)

(72) Inventors: Chang Seop Park, Seoul (KR); Samuel Woo, Seoul (KR)

(73) Assignee: INDUSTRY-ACADEMIC COOPERATION FOUNDATION, DANKOOK UNIVERSITY, Yongin-si (KR)

( * ) Notice: Subject to any disclaimer, the term of this patent is extended or adjusted under 35 U.S.C. 154(b) by 259 days.

(21) Appl. No.: 18/308,341

(22) Filed: Apr. 27, 2023

(65) Prior Publication Data

US 2023/0353387 A1    Nov. 2, 2023

(30) Foreign Application Priority Data

Apr. 27, 2022    (KR) ........................ 10-2022-0052326
Mar. 3, 2023    (KR) ........................ 10-2023-0028585

(51) Int. Cl.
| | |
|---|---|
| *H04L 9/32* | (2006.01) |
| *H04L 9/00* | (2022.01) |
| *H04L 9/06* | (2006.01) |
| *H04L 9/30* | (2006.01) |

(52) U.S. Cl.
CPC .......... *H04L 9/3247* (2013.01); *H04L 9/0643* (2013.01); *H04L 9/30* (2013.01); *H04L 9/302* (2013.01); *H04L 9/3218* (2013.01); *H04L 9/50* (2022.05)

(58) Field of Classification Search
CPC ........... G06Q 10/06316; G06F 16/951; G06F 16/164; G06F 40/30
See application file for complete search history.

(56) References Cited

U.S. PATENT DOCUMENTS 7,542,571 B2 *    6/2009    Asadu .............. H04N 21/63345
                                                  380/278
10,277,400 B1 *    4/2019    Griffin .................. H04L 9/3231
                                    (Continued)

FOREIGN PATENT DOCUMENTS

KR    10-2022-0143557    10/2022

*Primary Examiner* — Barbara B Anyan
(74) *Attorney, Agent, or Firm* — KILE PARK REED & HOUTTEMAN PLLC

(57) ABSTRACT

The present disclosure relates to a method and apparatus for electronic signature and, more particularly, to a method and apparatus for performing safe, post-quantum electronic signature using infinite continuity of a hash function and one-time key pairs. A method for electronic signature using a computing device according to one embodiment of the present disclosure comprises obtaining a message to be electronically signed; obtaining a plurality of public keys generated by a key generation algorithm, and based on the plurality of public keys, generating a signature verification value for the message, wherein the signature verification value includes at least one verification factor generated based on the different public keys or a value obtained by merging the different public keys.

10 Claims, 17 Drawing Sheets

(56)                    References Cited

U.S. PATENT DOCUMENTS

2005/0132201 A1*   6/2005  Pitman .................. H04L 9/3247
                                                    713/176
2015/0281187 A1*  10/2015  Ogura ................... H04L 9/3247
                                                    713/171
2018/0302227 A1*  10/2018  Seegebarth ........... H04W 12/06
2022/0051314 A1*   2/2022  Enkhtaivan ........... H04L 9/3218
2022/0337425 A1*  10/2022  Kim ...................... H04L 9/3247

* cited by examiner

FIG. 2

| MESSAGE $(m_n)$ | SIGNATURE DATA $(Sig_{SK_n}(m_n))$ | $PK_n$ | $y_n$ | $z_n$ |

210    220    230   231    232    233

200

FIG. 3
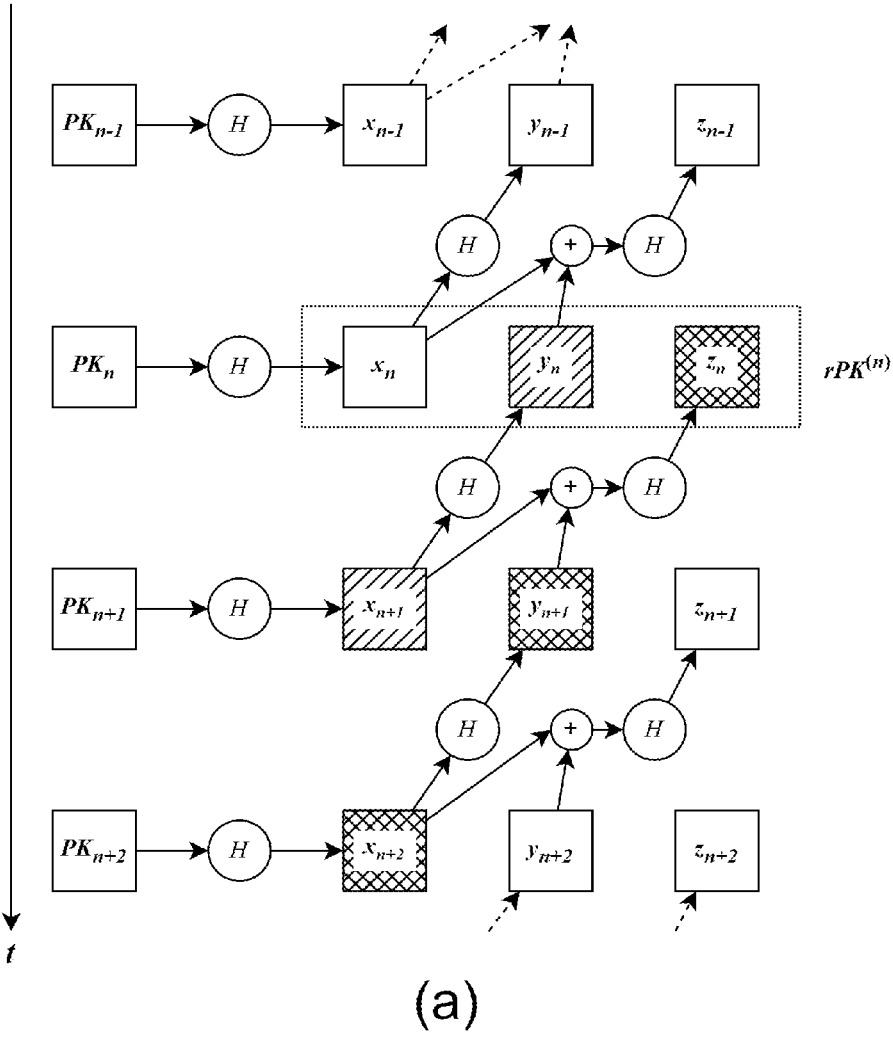
(a)
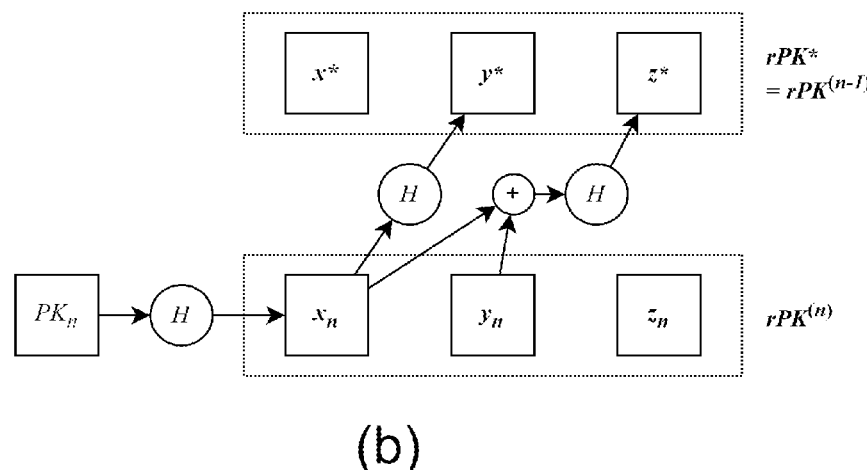
(b)

FIG. 5

FIG. 13
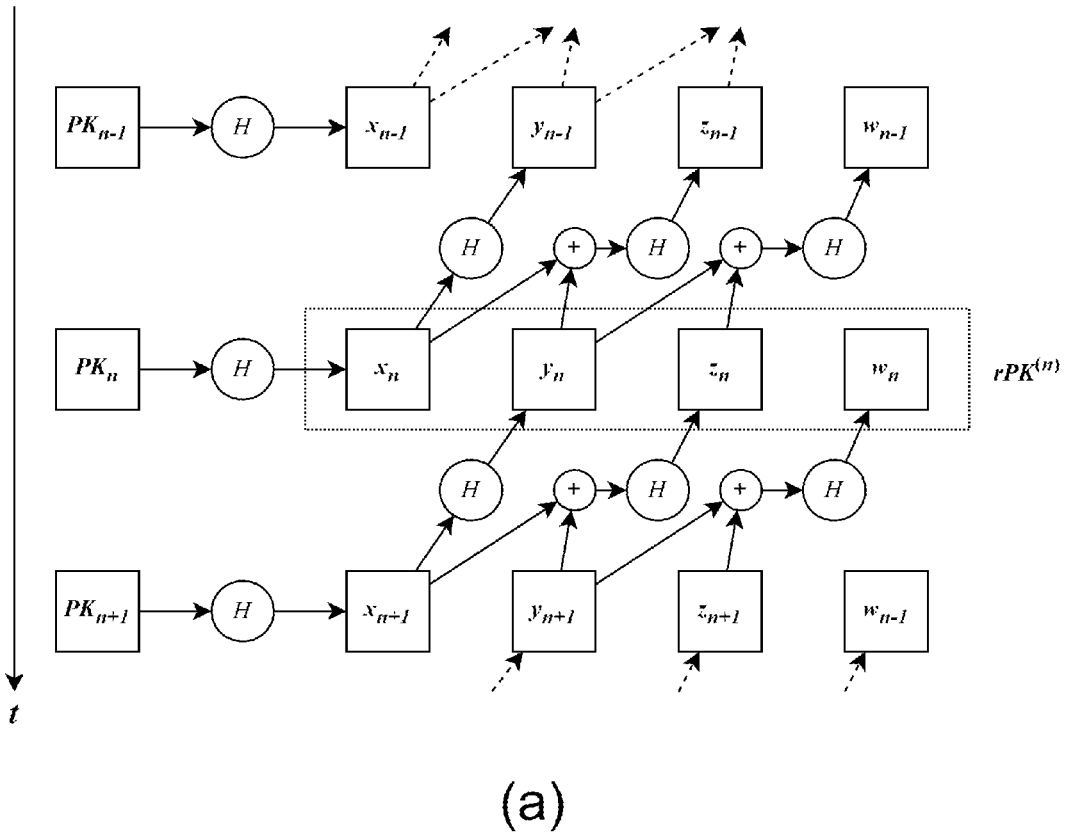
(a)
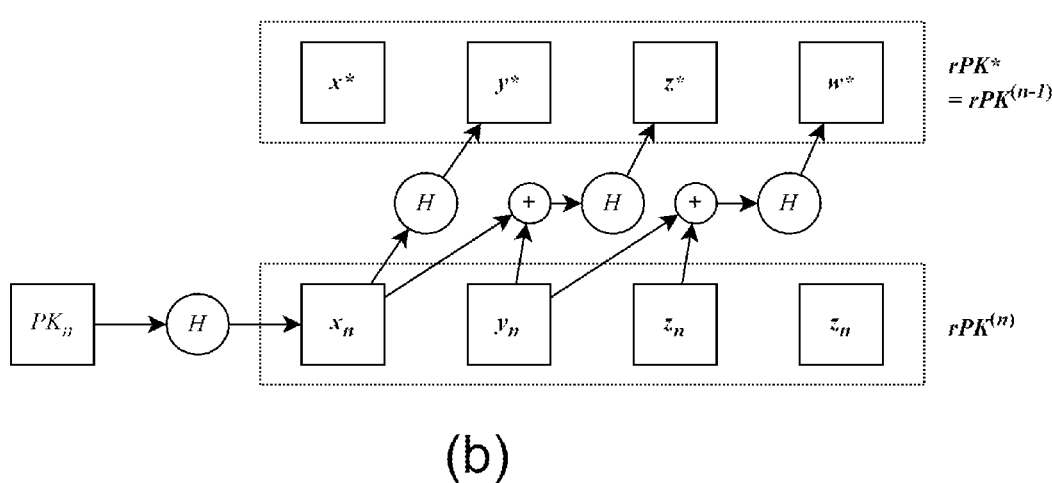
(b)

FIG. 14
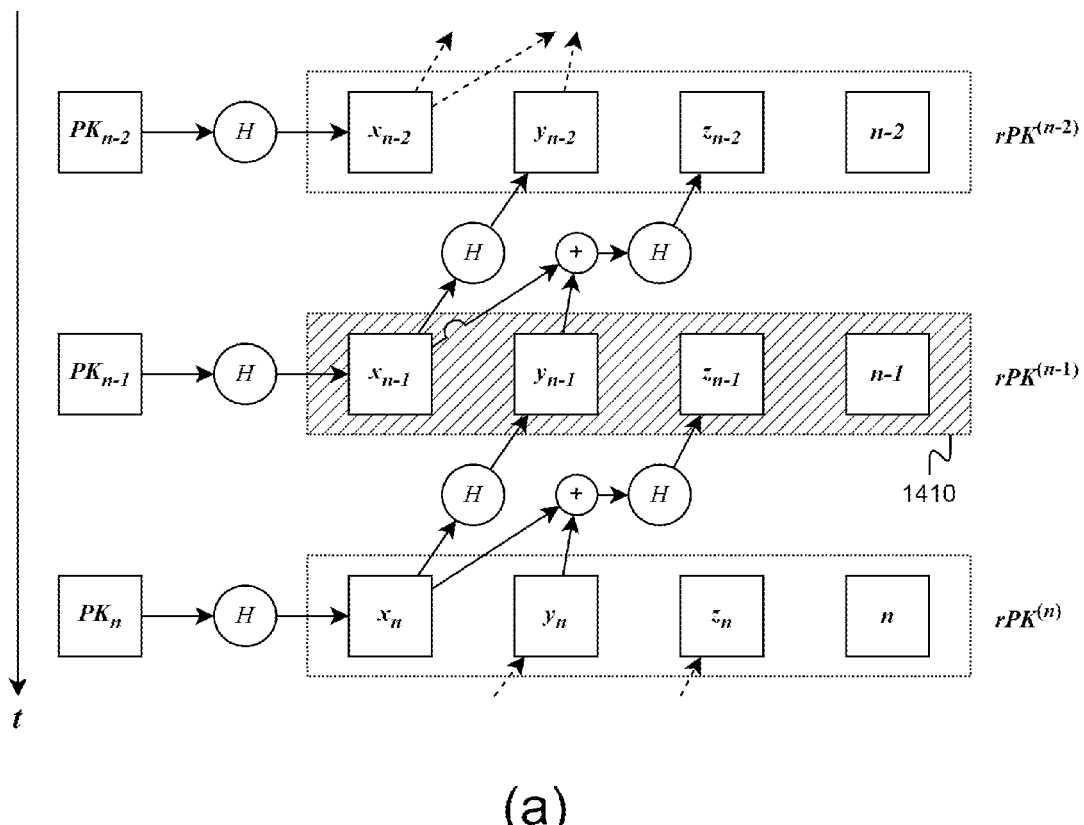
(a)
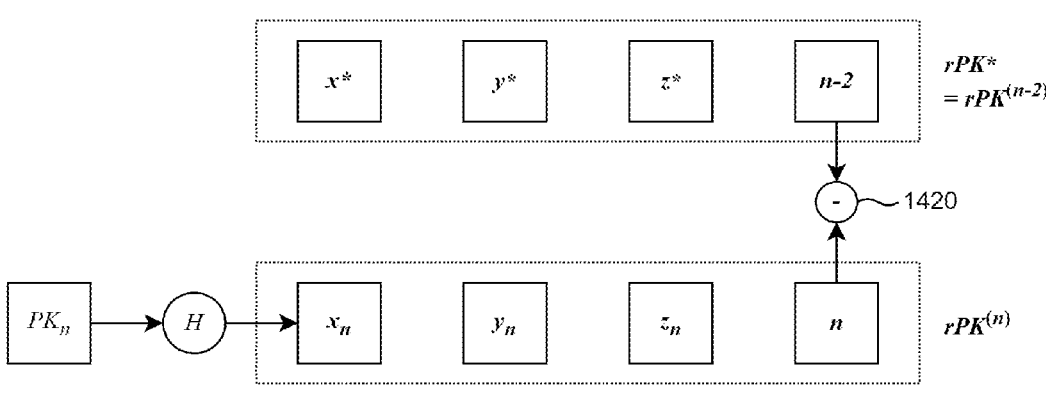
(b)

FIG. 15

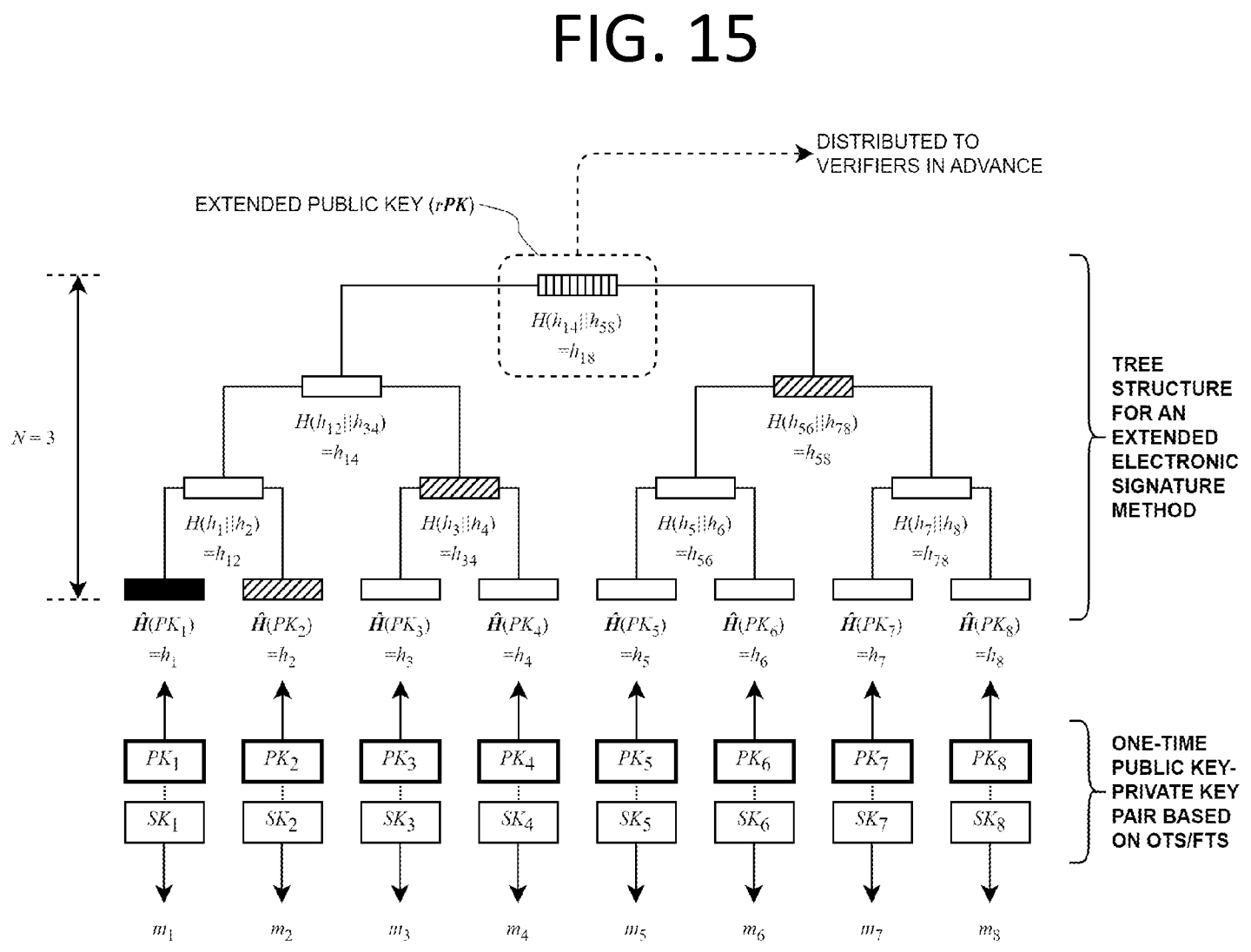

TREE STRUCTURE FOR AN EXTENDED ELECTRONIC SIGNATURE METHOD

ONE-TIME PUBLIC KEY-PRIVATE KEY PAIR BASED ON OTS/FTS

DISTRIBUTED TO VERIFIERS IN ADVANCE

EXTENDED PUBLIC KEY ($rPK$)

$H(h_{14}||h_{5S})$
$=h_{18}$ $H(h_{12}||h_{34})$
$=h_{14}$ $H(h_{56}||h_{78})$
$=h_{5S}$ $H(h_1||h_2)$
$=h_{12}$ $H(h_3||h_4)$
$=h_{34}$ $H(h_5||h_6)$
$=h_{56}$ $H(h_7||h_8)$
$=h_{78}$ $\hat{H}(PK_1)$
$=h_1$ $\hat{H}(PK_2)$
$=h_2$ $\hat{H}(PK_3)$
$=h_3$ $\hat{H}(PK_4)$
$=h_4$ $\hat{H}(PK_5)$
$=h_5$ $\hat{H}(PK_6)$
$=h_6$ $\hat{H}(PK_7)$
$=h_7$ $\hat{H}(PK_8)$
$=h_8$ $PK_1$   $SK_1$   $m_1$ $PK_2$   $SK_2$   $m_2$ $PK_3$   $SK_3$   $m_3$ $PK_4$   $SK_4$   $m_4$ $PK_5$   $SK_5$   $m_5$ $PK_6$   $SK_6$   $m_6$ $PK_7$   $SK_7$   $m_7$ $PK_8$   $SK_8$   $m_8$ $N = 3$

FIG. 16

| MESSAGE $(m_j)$ | SIGNATURE DATA $(SIG_{SK_j}(H(m_j \parallel v_j)))$ | PUBLIC KEY $(PK_j)$ | VERIFICATION VALUE $(authP_j)$ | | |
|---|---|---|---|---|---|
| | | | | $\beta_j$ | $v_j$ |

1610　　1620　　1630　　1640　　1641　　1642

1600

METHOD, APPARATUS, AND SYSTEM FOR POST-QUANTUM ELECTRONIC SIGNATURE BASED ON INFINITE HASH FUNCTION

TECHNICAL FIELD

The present disclosure relates to a method and apparatus for electronic signature and, more particularly, to a method and apparatus for performing safe, post-quantum electronic signature using infinite continuity of a hash function and one-time key pairs.

BACKGROUND

Conventional electronic signature methods such as RSA and DSA rely on one of the hard mathematical problems such as the integer factorization problem or the discrete logarithm problem. However, a new electronic signature method is required since the hard problems may be easily solved due to advances in quantum computing technology.

In response to the demand, hash-based signature (HBS) has emerged as a new electronic signature technique. HBS consists of a signature algorithm and an extended algorithm. The HBS algorithms typically include Lamport or Winternitz algorithm and have a structure for generating a one-time public-private key pair to implement and verify electronic signatures.

However, the HBS algorithm described above has a drawback in that one key pair may be used only once. Therefore, a new method has been proposed, which generates a plurality of public key-private key pairs to enable multiple uses through the HBS extension algorithm and applies each key to the HBS algorithm for electronic signatures. The HBS extension algorithm known to the public includes the Merkle tree scheme and the Extended Merkel Signature Scheme (XMSS) which improves the Merkle tree scheme. Furthermore, the XMSS-MT (Multi-Tree XMSS) scheme provides a structure that hierarchically connects a plurality of Merkle trees to increase the number of signature algorithm uses.

SUMMARY

Despite their unique features, the conventional methods of the prior art described above have limitations. Even the most advanced XMSS-MT scheme is subject to a number of limitations. First, since a finite number of one-time public key-private key pairs are determined according to the hierarchical depth of the tree structure, the number of applications of a signature algorithm is also finite. Second, the length of an electronically signed message is increased. As the tree hierarchy expands, the number of values required for authentication increases accordingly, which causes inefficiency in that all the values have to be attached as electronic signature verification values. Third, regardless of whether the tree is flat or hierarchical, it is possible to verify the electronic signature only when hash values assigned to all tree nodes are calculated and stored in advance.

To summarize the above disadvantages, whenever the tree depth is increased to maintain electronic signature security and communication efficiency, inefficiency occurs in a chained manner throughout the process of creating, transmitting, and verifying electronic signatures.

To solve the problem above, a method for electronic signature using a computing device according to one aspect of the present disclosure may comprise obtaining a message to be electronically signed; obtaining a plurality of public keys generated by a key generation algorithm, and based on the plurality of public keys, generating a signature verification value for the message, wherein the signature verification value includes at least one verification factor generated based on the different public keys or a value obtained by merging the different public keys.

The method for electronic signature may further include obtaining a first secret key generated by a key generation algorithm and generating key-based data by a signature generation function corresponding to the key generation algorithm using the message and the first secret key.

The key generation algorithm may be a one-time public key-private key pair generation algorithm, where the first public key and the first private key are generated as a pair simultaneously.

The plurality of public keys may include a first public key, a second public key, and a third public key; and the signature verification value may include the first verification factor, the second verification factor, and the third verification factor, where the first verification factor is a value generated based on the first public key, the second verification factor is a value generated based on the second public key, and the third verification factor is a value generated based on the second public key and the third public key.

The first verification factor may employ the first public key without modification.

The second verification factor may be a value obtained by applying a hash function to the second public key at least once.

The second verification factor may be a value obtained by applying a hash function to the second public key at least once to generate a fourth verification factor and applying the hash function to the fourth verification factor at least once.

Among the signature verification values, the third verification factor may be a value obtained by merging the fourth verification factor obtained by applying a hash function to the second public key at least once and a fifth verification factor obtained by applying the hash function to the third public key at least once; and applying the hash function to the merged value at least once.

The fifth verification factor may be a value obtained by applying a hash function to a sixth verification factor obtained by applying the hash function to the third public key at least once, and the third verification factor may be a value obtained by applying the hash function to the merged value at least once.

The merge operation may use any one of the bitwise AND, OR, or XOR operation.

To solve the problem above, a method for verifying an electronic signature using a computing device according to one aspect of the present disclosure may comprise retrieving a root verification value stored in the device (the root verification value includes at least one root factor), obtaining data for verifying an electronic signature, wherein the data includes a message and a signature verification value (the signature verification value includes at least one verification factor), verifying that includes at least one verification procedure for checking whether each of the at least one root factor is the same as the different verification factor or a value generated based on a value obtained by merging the different verification factors; determining that the message is verified if all verification procedures of the verifying are satisfied; and root updating for updating each of the at least one root factor to a value generated based on the at least one verification factor according to the determination.

The route verification value may include a first route factor, a second route factor, and a third route factor.

The signature verification value includes a first verification factor, a second verification factor, and a third verification factor; and the verifying may include a first verification procedure for checking whether the second root factor is the same as a value generated based on the first verification factor and a second verification procedure for checking whether the third root factor is the same as a value generated based on the first verification factor and the second verification factor.

The root updating may be characterized in that the root verification value is updated by replacing the first root factor with a value based on the first verification factor, replacing the second root factor with a value based on the second verification factor, and replacing the third root factor with a value based on the first verification value and the second verification value.

The first verification procedure may be a procedure for checking whether the second root factor is a value generated by applying a hash function to the first verification factor at least once.

The first verification procedure may be a procedure that generates a first operation value by applying a hash function to the first verification factor at least once and checks whether a value obtained by applying the hash function to the first operation value at least once is the same as the second root factor.

The second verification procedure may be a procedure that obtains a merged value by merging the first operation value obtained by applying a hash function to the first verification factor and a second merged value generated based on the second verification factor and checks whether the third root factor is a value generated by applying the hash function to the merged value at least once.

The second operation value may be the same as the second verification factor, and the second verification procedure may be a procedure that checks whether a value obtained by applying a hash function to the merged value at least once is the same as the third root factor.

The merge operation may use any one of the bitwise AND, OR, or XOR operation.

The data for verifying the electronic signature may further include key-based data, the verification factor may include at least one of the values generated based on a public key generated by a key generation algorithm, and the verifying may include a third verification procedure that obtains the public key from the at least one verification factor and checks validity of the key-based data by a signature verification function corresponding to the key generation algorithm using the message and the public key.

To solve the problem above, a computing device performing electronic signature according to one aspect of the present disclosure may comprise an input unit receiving a message to be signed electronically, a key generation unit generating a plurality of public key-secret key pairs, an electronic signature unit generating a signature verification value for the message based on a plurality of public keys generated by the key generation unit, and an output unit outputting the message and the signature verification value, wherein the signature verification value includes at least one verification factor generated based on the different public keys or a value obtained by merging the different public keys.

To solve the problem above, a computing device performing verification of an electronic signature according to one aspect of the present disclosure may comprise a memory storing a root verification value including at least one root factor; an input unit receiving data for verifying an electronic signature (where the data includes a message and a signature verification value, and the signature verification value includes at least one verification factor); a verification unit retrieving the root verification value from the memory, performing at least one verification procedure for checking whether each of the at least one root factor is the same as the different verification factor or a value generated based on a value obtained by merging the different verification factors, and determining that the message is verified if all verification procedures are satisfied; an output unit outputting the verification result; and an update processing unit updating each of the at least one root factor to a value generated based on the at least one verification factor according to the verification result.

To solve the problem above, a communication system using an electronic signature method agreed between a transmitting terminal and a receiving terminal according to one aspect of the present disclosure may be configured so that the content of communication includes a message, a signature value, and a signature verification value; the signature value is an electronic signature value generated using a first secret key generated by the transmitting terminal and the message; the signature verification value includes a first verification factor, a second verification factor, and a third verification factor; the transmitting terminal initializes the receiving terminal before initiation of communication by transmitting initial values of at least a second verification factor and a third verification factor among the signature verification values to the receiving terminal; the first verification factor, which is a value generated based on a first public key generated by the transmitting terminal and corresponding to the first secret key, is used by the receiving terminal to be compared with a second root factor and a third root factor stored in the receiving terminal and is stored in the receiving terminal as a first root factor; the second verification factor, which is a value generated based on a second public key generated by the transmitting terminal, is used by the receiving terminal to be compared with the third root factor stored in the receiving terminal and is stored in the receiving terminal as a second root factor; and the third verification factor, which is a value generated based on a third public key generated by the transmitting terminal, is stored in the receiving terminal as a third root factor.

To solve the problem above, a method for generating an electronically signed message using a computing device according to one aspect of the present disclosure may comprise obtaining a message to be electronically signed; generating a public key and a private key using a key generation algorithm, generating electronic signature data based on the message and the private key; generating at least one verification factor for verifying the integrity of the electronic signature data; generating a verification value including at least one of the verification factors; and generating an electronically signed message including the message, the electronic signature data, the public key, and the verification value.

The method may further include generating at least one alpha-verification factor, generating at least one beta-verification factor, generating at least one gamma-verification factor, and storing the at least one public key, the at least one private key, and the at least one alpha-verification factor in the memory of the computing device, wherein the generating the electronic signature data includes generating the electronic signature data based on the message, the at least one alpha-verification factor, the at least one beta-verification factor, and the at least one gamma-verification factor, and the verification value includes the at least one beta-verification factor and the at least one gamma-verification factor.

The method may include identifying transmission order x of the message; defining transmission order y greater than the transmission order x and transmission order z greater than the transmission order x and different from the transmission order y; retrieving, from the memory of the computing device, the public key $PK_x$ of the transmission order x, the private key $SK_x$ of the transmission order x, the public key $PK_x$ of the transmission order y, the private key $SK_y$ of the transmission order y, the alpha-verification factor $\alpha_x$ of the transmission order x, and the alpha-verification factor $\alpha_y$ of the transmission order y; obtaining a message $m_x$ of the transmission order x to be electronically signed; generating the public key $PK_z$ of transmission order z and the private key $SK_z$ of the transmission order z; generating the alpha-verification factor $\alpha_z$ of the transmission order z based on the $PK_z$; generating the beta-verification factor $\beta_x$ of the transmission order x based on the $\alpha_y$; generating the beta-verification factor $\beta_y$ of the transmission order y based on the $\alpha_z$; generating the gamma-verification factor $\gamma_x$ of the transmission order x based on the $\alpha_y$ and the $\beta_y$; generating the electronic signature data $SIG_x$ of the transmission order x based on the $m_x$, the $\gamma_x$, and the $SK_x$; generating the verification value $authP_x$ of the transmission order x based on the $\beta_x$ and the $\gamma_x$; generating an electronically signed message of the transmission order x including the $m_x$, the $SIG_x$, the $PK_x$, and the $authP_x$; and storing the $PK_y$, the $SK_y$, the $PK_z$, the $SK_z$, the $\alpha_y$, and the $\alpha_z$ in the memory of the computing device.

The $\alpha_z$ is generated based on $\hat{H}(PK_z)$, which is a value obtained by applying a compression operation $\hat{H}$ to the $PK_z$, and the compression operation $\hat{H}$ may be performed by an operation including a function operation that receives a binary number sequence with a first length and outputs a binary number sequence with a second length shorter than the first length.

The $\beta_x$ may be generated based on the value $H(\alpha_y)$ obtained by applying a hash operation H to the $\alpha_y$, the $\beta_y$ may be generated based on the value $H(\alpha_z)$ obtained by applying a hash operation H to the $\alpha_z$, and the hash operation H may be performed by an operation including a collision-resistant hash function operation that receives a binary number sequence with an arbitrary length and outputs a binary number sequence with a third length.

The $\gamma_x$ may be generated based on the value $H(\alpha_a\|\beta_y)$ obtained by applying the hash operation H to the value obtained by applying a merge operation $\|$ to the $\alpha_y$ and the $\beta_y$, the $SIG_x$ may be generated by applying the hash operation H to the value obtained by applying the merge operation $\|$ to the $m_x$ and the $\gamma_x$ and encrypting a private key using the $SK_x$, the hash operation H may be performed by an operation including the collision-resistant hash function operation that receives a binary number sequence with an arbitrary length and outputs a binary number sequence with the third length, and the merge operation $\|$ may be performed by an operation including a function operation that simply concatenates two binary number sequences with an arbitrary length.

The method may further include initializing the computing device, wherein the initializing may include generating at least one initial public key and at least one initial private key using the key generation algorithm; generating at least one initial alpha-verification factor; generating at least one beta-verification factor; generating at least one initial gamma-verification factor; generating an initial root public key based on the at least one beta-verification factor and the at least one gamma-verification factor; and storing the at least one initial public key, the at least one initial private key, and the at least one alpha-verification factor in the memory of the computing device.

The method may include defining transmission order at an initialization time as x; defining transmission order y greater than the transmission order x and transmission order z greater than the transmission order x and different from the transmission order y; generating a public key $PK_y$ of the transmission order y and a private key $SK_y$ of the transmission order y; generating the public key $PK_z$ of the transmission order z and the private key $SK_z$ of the transmission order z; generating the alpha-verification factor $\alpha_y$ of the transmission order y based on the $PK_y$; generating the alpha-verification factor $\alpha z$ of the transmission order z based on the $PK_z$; generating the beta-verification factor $\beta_x$ of the transmission order x based on the $\alpha_y$; generating the beta-verification factor $\beta_y$ of the transmission order y based on the $\alpha_z$; generating the gamma-verification factor $\gamma_x$ of the transmission order x based on a value obtained by merging the $\alpha_y$ and $\beta_y$; generating the initial root public key $rPK^{(0)}$ based on the $\beta_x$ and the $\gamma_x$; and storing the $PK_y$, the $SK_y$, the $PK_z$, the $SK_z$, the $\alpha_y$, and the $\alpha_z$ in the memory of the computing device.

The $\alpha_y$ may be generated based on $\hat{H}(PK_y)$ obtained by applying compression operation $\hat{H}$ to the $PK_y$; the $\alpha_z$ may be generated based on $\hat{H}(PK_z)$ obtained by applying compression operation $\hat{H}$ to the $PK_z$; the $\beta_x$ may be generated based on $H(\alpha_y)$ obtained by applying hash operation H to the $\alpha_y$; the $\beta_y$ may be generated based on $H(\alpha_z)$ obtained by applying hash operation H to the $\alpha_z$; the $\gamma_x$ may be generated by $H(\alpha_a\|\beta_y)$ obtained by applying hash operation H to the value obtained by applying merge operation $\|$ to the $\alpha_y$ and the $\beta_y$; the compression operation H may be performed by an operation including a function operation that receives a binary number sequence with a first length and outputs a binary number sequence with a second length shorter than the first length; the hash operation H may be performed by an operation including a collision-resistant hash function operation that receives a binary number sequence with an arbitrary length and outputs a binary number sequence with a third length; and the merge operation $\|$ may be performed by an operation including a function operation that simply concatenates two binary number sequences with an arbitrary length.

The transmission order y has a value of x+1, and the transmission order z has a value of x+2.

To solve the problem above, a method for verifying an electronically signed message using a computing device according to one embodiment of the present disclosure may comprise obtaining an electronically signed message including an original message, electronic signature data, an electronic signature public key, and a verification value; retrieving, from the memory of the computing device, a root public key including at least one root factor; verifying first integrity through an operation based on the electronic signature public key and the at least one root factor; verifying second integrity through an operation based on the original message, the electronic signature data, the electronic signature public key, and the verification value; and, when both the first integrity and the second integrity are verified, changing the root public key into an alternative public key generated based on the verification value and storing the generated alternative public key.

The method may further include retrieving at least one beta-root factor and at least one gamma-root factor included in the root public key from the memory of the computing device; generating at least one alpha-verification factor; and obtaining at least one beta-verification factor and at least one gamma-verification factor from the verification value, wherein the verifying the first integrity includes determining whether an operation result based on the at least one alpha-verification factor is the same as the at least one beta-root factor, determining whether an operation result based on the at least one alpha-verification factor and the beta-verification factor is the same as the first integrity, and determining the first integrity is verified when the operation results are the same as the first integrity and the second integrity respectively; the verifying the second integrity includes determining whether an operation result based on the original message and the at least one gamma-verification factor is the same as an operation result based on a value obtained by decrypting the electronic signature data using the electronic signature public key and determining that the second integrity is verified when the operation results are the same to each other; and the changing the root public key includes generating an alternative public key based on the beta-verification factor and the gamma-root factor and changing the root public key recorded in the memory of the computing device into the alternative public key and storing the alternative public key.

The method may include retrieving the root public key rPK* and retrieving the beta-root factor $\beta^*$ and the gamma-root factor $\gamma^*$ included in the rPK* from the memory of the computing device, obtaining the beta-verification factor $\beta$ and the gamma-verification factor $\gamma$ from the verification value authP, generating the alpha-verification factor $\alpha$ based on the electronic signature public key PK, determining whether the $\beta^*$ is the same as a value computed based on the $\alpha$, determining whether the $\gamma^*$ is the same as a value computed based on the $\alpha$ and the $\gamma$, determining that the first integrity is verified when the $\beta^*$ is the same as the $\gamma^*$, determining whether a value V computed based on the original message m and the $\gamma$ is the same as a value obtained by decrypting the electronic signature data SIG into the PK, generating the alternative public key rPK based on the $\beta$ and the $\gamma$, and changing the rPK* into the rPK and storing the rPK in the memory of the computing device.

The $\alpha_x$ may be generated based on $\hat{H}(PK_x)$ obtained by applying compression operation $\hat{H}$ to the $PK_x$, and the compression operation $\hat{H}$ may be performed by an operation including a function operation that receives a binary number sequence with a first length and outputs a binary number sequence with a second length shorter than the first length.

The $\beta^*$ may be compared to check whether it is the same as a value generated based on $H(\alpha_x)$ obtained by applying hash operation H to the $\alpha_x$, and the hash operation H may be performed by an operation including a collision-resistant hash function operation that receives a binary number sequence with an arbitrary length and outputs a binary number sequence with a third length.

The $\gamma^*$ may be compared to check whether it is the same as a value $H(\alpha_x\|\beta_x)$ obtained by applying hash operation H to the value obtained by applying merge operation $\|$ to the $\alpha_x$ and the $\beta_x$, the $V_x$ may be a value obtained by applying hash operation H to the value obtained by applying merge operation $\|$ to the $m_x$ and the $\gamma_x$, the hash operation H may be performed by an operation including a collision-resistant hash function operation that receives a binary number sequence with an arbitrary length and outputs a binary number length with a third length, and the merge operation $\|$ may be performed by an operation including a function operation that simply concatenates two binary number sequences with an arbitrary length.

The method may further include initializing the computing device, wherein the initializing may include obtaining an initial root public key including at least one beta-root factor and at least one gamma-root factor and storing the initial root public key into the memory of the computing device as a root public key.

To solve the problem above, a computing device for generating an electronically signed message according to one aspect of the present disclosure may comprise a processor having a computing function; a memory connected to the processor; an input unit receiving a message to be electronically signed; a key generation unit generating a pair of a public key and a secret key using a key generation algorithm; an electronic signature unit generating electronic signature data based on the message and the private key, generating at least one verification factor for verifying the integrity of the electronic signature data, and generating a verification value including at least one from among the verification factors; and an output unit outputting an electronically signed message including the message, the electronic signature data, the public key, and the verification value.

To solve the problem above, a computing device for verifying an electronically signed message according to one aspect of the present disclosure may comprise a processor having a computing function; a memory connected to the processor and storing a root public key including at least one root factor; an input unit receiving a message for which an electronic signature is to be verified, the message including an original message, electronic signature data, an electronic signature public key, and a verification value; a verification unit configured to retrieve, from the memory, a root public key including at least one root factor, verify first integrity through an operation based on the electronic signature public key and the at least one root factor, verify second integrity through an operation based on the original message, the electronic signature data, the electronic signature public key, and the verification value, and determine that the to-be-verified message is verified when both the first integrity and the second integrity are verified; an output unit outputting the verification result; and an update processing unit changing the root public key into an alternative public key generated based on the verification value according to the determination result of the verification unit and storing the generated alternative public key in the memory.

To solve the problem above, in a signal control system including a controller and at least one operation device according to one aspect of the present disclosure, the controller may be configured to transmit a control signal to the at least one operation device, the at least one operation device may be initialized to receive the control signal, wherein the initializing includes storing a root public key including at least one root factor generated by the controller, wherein the controller may be configured to generate at least one public key and at least one private key using a key generation algorithm, generate at least one verification factor for which integrity may be verified by applying hash operation to the root factor at least once based on the public key, generate a verification value including the at least one verification factor, generate electronic signature data by encrypting a value generated based on the message using the private key, and transmit a control signal including the message, the electronic signature data, the public key, and the verification value, wherein the operation device may be configured to receive the control signal, apply at least one hash operation to at least one verification factor extracted from the verification value, verify first integrity by comparing the operation result with the at least one root factor extracted from the root public key, verify second integrity of the electronic signature data using the public key based on a decrypted value, and determine that the integrity of the control signal is verified when both the first integrity and the second integrity are verified, and the receiving device may be configured to update the root public key based on the verification value when it is determined that the integrity of the control signal is verified and process the control signal in a normal manner.

A method for post-quantum electronic signature based on infinite hash function according to the present disclosure removes the disadvantages in the tree based HBS extension algorithms. First, a hash chain of infinite length may be utilized, which imposes no limits on how many times the HBS signature algorithm is used. Second, the number of verification values that have to be attached to a message for verification of an electronic signature is always constant. Third, the post-quantum properties may be secured only by using a minimum of three hash algorithm handling verification values. In other words, powerful, post-quantum HBS electronic signatures, which is not limited by the tree expansion and the number of trees, may be performed.

BRIEF DESCRIPTION OF THE DRAWINGS

FIG. 2 is a conceptual diagram illustrating a data structure of an electronically signed message according to one embodiment of the present disclosure.

FIG. 3 illustrates generation of a verification value and a verification structure based on an infinite hash chain according to one embodiment of the present disclosure.

FIG. 5 illustrates a procedure for verifying a message with an electronic signature according to one embodiment of the present disclosure.

FIG. 13 is a conceptual diagram illustrating generation of a verification value and a verification structure based on an infinite hash chain according to one embodiment of the present disclosure.

FIG. 14 is a conceptual diagram illustrating generation of a verification value and a verification structure based on an infinite hash chain according to an additionally modified embodiment of the present disclosure.

FIG. 15 is an additional conceptual diagram illustrating a method for electronic signature based on a hash function according to the prior art.

FIG. 16 is another conceptual diagram illustrating a data structure of an electronically signed message according to one embodiment of the present disclosure.

DETAILED DESCRIPTION

Figure 1:
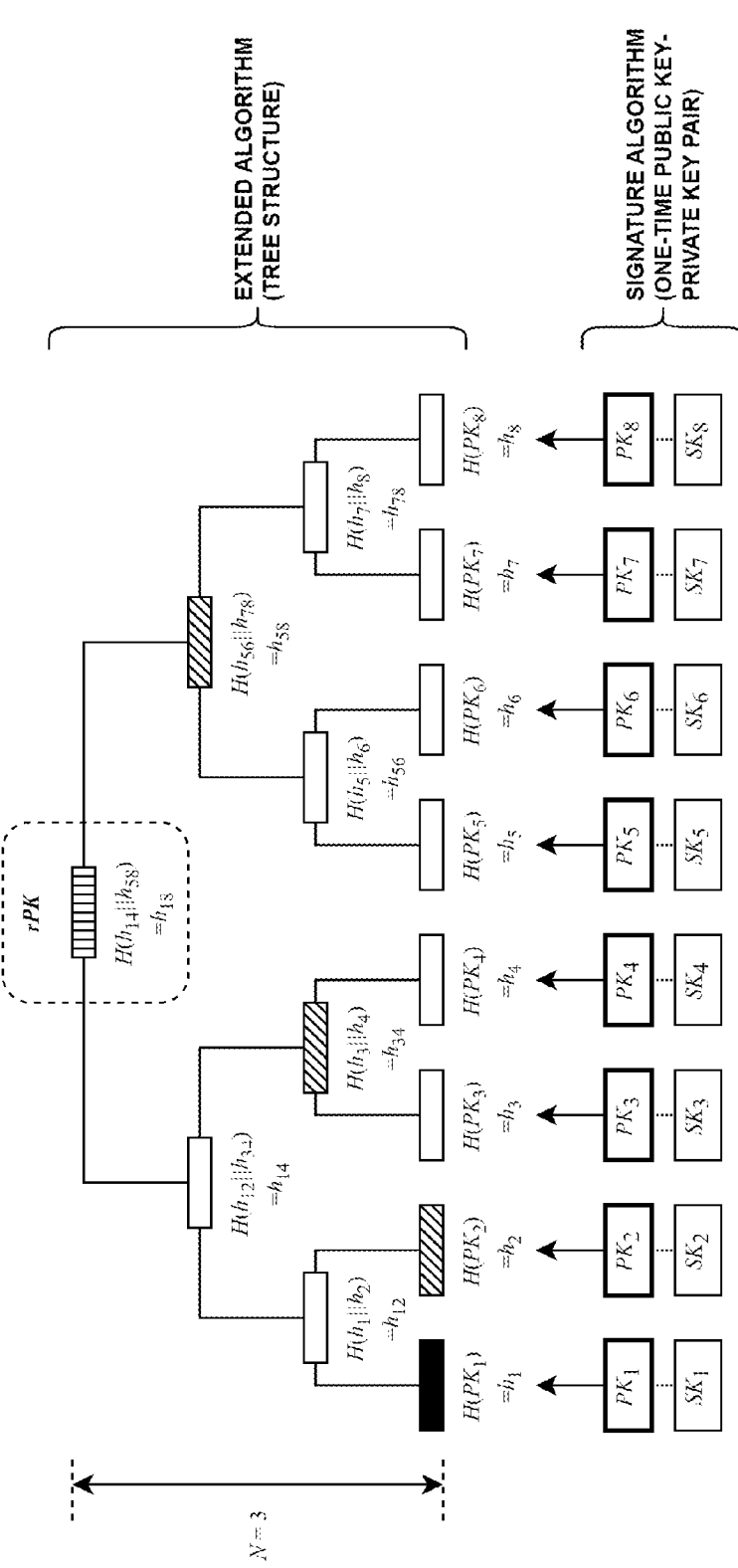
FIG. 1 is a conceptual diagram illustrating a method for electronic signature based on a hash function according to the prior art.

Since the present disclosure may be modified in various ways and may provide various embodiments, specific embodiments will be depicted in the appended drawings and described in detail with reference to the drawings.

However, it should be understood that the specific embodiments are not intended to limit the gist of the present disclosure; rather, it should be understood that the specific embodiments include all of the modifications, equivalents or substitutes belonging to the technical principles and scope of the present disclosure.

The terms such as first and second are introduced to describe various elements, but the elements should not be limited by the terms. The terms are used only for the purpose of distinguishing one from the other elements. For example, a first element may be called a second element without leaving the technical scope of the present disclosure, and similarly, the second element may be called the first element. The term and/or includes any one of a combination of a plurality of related disclosed elements or a plurality of related disclosed elements.

If an element is said to be "connected" or "attached" to a different element, the former may be connected or attached directly to the different element, but another element may be present between the two elements. On the other hand, if an element is said to be "directly connected" or "directly attached" to a different element, it should be understood that there is no other element between the two elements.

Terms used in this document are intended only for describing a specific embodiment and are not intended to limit the technical scope of the present disclosure. A singular expression should be understood to indicate a plural expression unless otherwise explicitly stated. The term of "include" or "have" is used to indicate existence of an embodied feature, number, step, operation, element, component, or a combination thereof; and should not be understood to preclude the existence or possibility of adding one or more other features, numbers, steps, operations, elements, components, or a combination thereof.

Unless defined otherwise, all the terms used in the present disclosure, including technical or scientific terms, provide the same meaning as understood generally by those skilled in the art to which the present disclosure belongs. Those terms defined in ordinary dictionaries should be interpreted to have the same meaning as conveyed in the context of related technology. Unless otherwise defined explicitly in the present disclosure, those terms should not be interpreted to have ideal or excessively formal meaning.

When the term "apparatus" is used in describing the present disclosure, it is intended to describe an embodiment for explaining a particular function of the present disclosure that may be implemented as a device, and it is not meant that the function of the corresponding device has to be implemented a single independent device. One device may be implemented with a plurality of devices performing the same function; conversely, one device may be installed to perform the functions of a plurality of devices simultaneously. Functions of a particular device may be implemented by other devices through software means or by general computers and information processing devices. Also, when a plurality of devices are used, each device may be connected only through communication and may be separated from each other in a physical space. Since various embodiments may be utilized by a person skilled in the art of information and communication technology to implement the same technical principles of the present disclosure, detailed methods for implementing the embodiments should be construed as being included in the technical scope of the present disclosure.

In what follows, with reference to appended drawings, preferred embodiments of the present disclosure will be described in more detail. In describing the present disclosure, to help overall understanding, the same reference symbols are used for the same elements in the drawings, and repeated descriptions of the same elements will be omitted.

The Prior Art Underlying the Present Disclosure

The common structure of the HBS extension algorithm according to the prior art is shown in FIG. 1. FIG. 1 is a conceptual diagram illustrating a method for electronic signature based on a hash function according to the prior art. Referring to FIG. 1, a hash tree having a depth of N is constructed, $2^N$ one-time public key-private key pairs ($PK_i$, $SK_i$) are generated; each of the $2^N$ leaf nodes of the hash tree has a result value ($h_1$, $h_2$, . . . , $h_8$) obtained by applying a hash function H to one public key; and the result values obtained by applying the hash function again to the values obtained by merging the result values assigned to the lower two nodes are provided to the internal nodes. As a result, the value $h_{18}$ placed at the root of the tree becomes the root public key rPK in the HBS extension algorithm.

FIG. 1 illustrates a tree-based HBS extension algorithm when N=3. Therefore, an electronic signature is generated through the HBS signature algorithm for $2^N=8$ messages ($m_1$, $m_2$, . . . , $m_8$). For example, a one-time public key-private key pair ($PK_1$, $SK_1$) may be applied to message $m_1$, and an electronic signature message for message $m_1$ may be generated as shown in Eq. 1 below using the one-time private key $SK_1$.

$$[m_1, Sig_{SK_1}(m_1),(PK_1, h_2, h_{34}, h_{58})] \qquad [Eq. 1]$$

In Eq. 1, Sig( ) is a one-time electronic signature data generation algorithm based on the HBS signature algorithm, such as the Lamport or the Winternitz algorithm. $PK_1$ is a one-time public key for verifying $Sig_{SK_1}(m_1)$. Since a hash function for encryption has resistance to a preimage attack, an authentication path is created from the one-time public key to a fixed root public key using individual hash values on the tree. Referring to FIG. 1, the one-time public key $PK_1$ is unidirectionally connected to the root public key rPK ($=h_{18}$) through hash values $h_2$, $h_{34}$, and $h_{58}$ on the certification path. The individual hash values are attached to the electronically signed message as a verification factor for the electronic signature.

Through the connectivity as described above, it is possible to verify that the one-time public key is valid for the fixed root public key, which is expressed by Eq. 2 below.

$$rPK(=h_{18})=H(H(H(H(PK_1)\|h_2)\|h_{34})\|h_{58}) \qquad [Eq. 2]$$

Eq. 2 verifies a signed message created by Eq. 1, which is used for verifying the validity of the one-time public key $PK_1$ for the root public key rPK Whether $VerPK_1(m_1$, $SigSK_1(m_1))$ is true is checked using a one-time electronic signature verification function Ver( ) which verifies the electronic signature data using $PK_1$, and thus the electronic signature verification for the entire message is completed. Furthermore, messages $m_2$ to mg may be electronically signed and verified in the same way. The electronically signed message for each message is expressed by Eq. 3 below.

$$[m_2,Sig_{SK_2}(m_2),(PK_2,h_1,h_{34},h_{58})]$$

$$[m_3,Sig_{SK_3}(m_3),(PK_3,h_4,h_{12},h_{58})]$$

$$[m_4,Sig_{SK_4}(m_4),(PK_4,h_3,h_{12},h_{58})]$$

$$[m_5,Sig_{SK_5}(m_5),(PK_5,h_6,h_{78},h_{14})]$$

$$[m_6,Sig_{SK_6}(m_6),(PK_6,h_5,h_{78},h_{14})]$$

$$[m_7,Sig_{SK_7}(m_7),(PK_7,h_6,h_{56},h_{14})]$$

$$[m_8,Sig_{SK_8}(m_8),(PK_8,h_7,h_{56},h_{14})] \qquad [Eq. 3]$$

As described above, however, the prior art has clear limitations. First, since the number of one-time public key-private key pairs is determined to be finite according to the depth of the tree hierarchy, the number of applications of the signature algorithm is also limited. As shown in FIG. 1, when N is set to 3, eight one-time public key-private key pairs are generated; therefore, only up to eight messages may be electronically signed. After all the key pairs are used, a new tree and key pairs should be configured; in particular, a problem is caused in that a newly generated root public key corresponding to the new tree has to be distributed securely.

Second, the length of an electronically signed message increases. As the stratification of the tree progresses, the number of values required for authentication also increases, which causes inefficiency in that all of the values have to be attached to a message as an electronic signature verification factor. In the case of FIG. 1, since N is set to 3, three hash values have to be used as verification factors to configure a certification path on the tree for verification. Suppose the depth of the tree is extended to N to increase the security level or the number of messages that may be transmitted; in that case, the number of verification factors also increases to N. For example, if N is set to 20, the number of hash values for configuring the certification path is also set to 20. In this regard, there is a concern that the capacity of an electronically signed message may be set to be excessively large.

Third, regardless of whether a tree is flat or hierarchical, ordinary verification of an electronic signature is made possible only when hash values given to all nodes constituting the tree are calculated and stored in advance. While the number of verification factors increases proportionally, the number of hash values to be calculated for signature and verification procedures is ($2^{N+1}-1$), which increases exponentially. The case of FIG. 1 corresponds to a single tree structure in which N is set to 3, and a total of 15 hash values ($2^{3+1}-1$) have to be calculated in advance to verify an electronic signature belonging to the corresponding tree. If N is set to 20, ($2^{20+1}-1$) hash values have to be calculated in advance, so 2,097,151 hash values are required. Therefore, heavy computational and memory loads may be imposed on the transmission/reception block for implementing a secure electronic signature.

Structure of an Electronic Signature Based on an Infinite Hash Chain

The present disclosure proposes a new extension algorithm that eliminates the three disadvantages of the conventional HBS extension algorithms. According to one embodiment of the present disclosure, an infinite hash chain may be employed for the HBS extension algorithm to replace the existing tree-based methods HBS extension algorithm. The infinite hash chain overcomes the disadvantage of the existing hash chain having a finite length; in particular, the infinite hash chain may be used to design a one-time password (OTP) based on the hash chain.

As described above, when the infinite hash chain used for OTP is employed as a basis of the HBS extension algorithm, no limit is imposed on the number of uses of the HBS signature algorithm. Also, since the infinite hash chain does not configure a tree that expands according to the number of end nodes, the number of hash values to be calculated and stored in advance may always be kept constant. Also, by using a variable root public key instead of a fixed root public key used in the tree method, the security burden due to the redistribution of the root public key may be reduced, while the root public key may be kept synchronized between a transmitting terminal and a receiving terminal.

Figure 2:
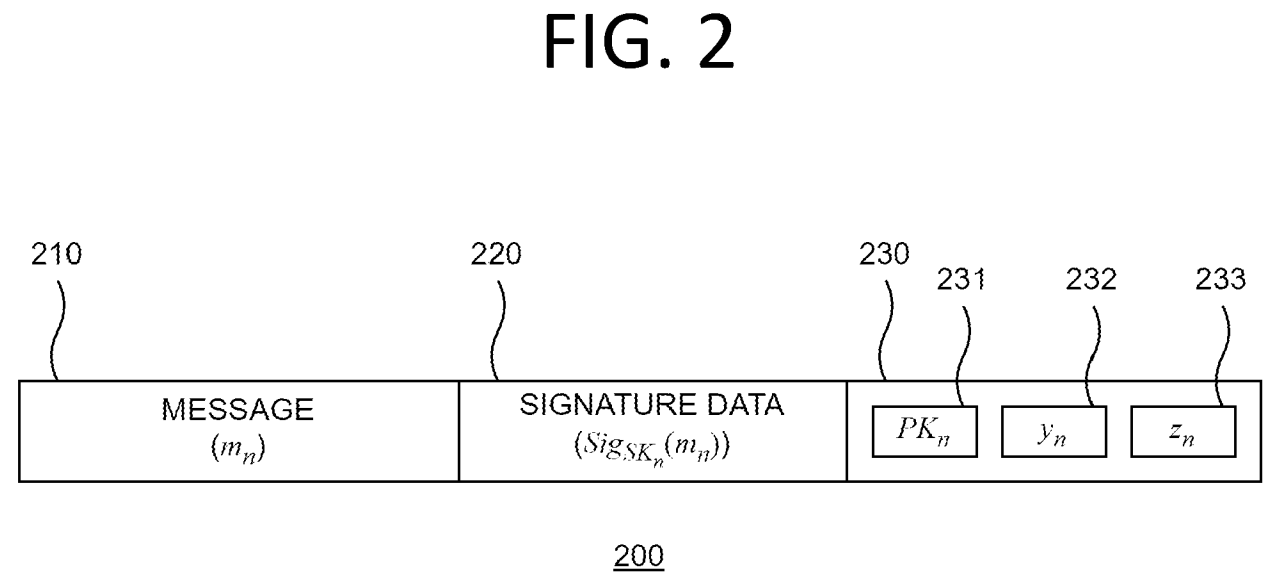

FIG. 2 is a conceptual diagram illustrating a data structure of an electronically signed message according to one embodiment of the present disclosure. In the embodiment of FIG. 2, an electronically signed message 200 comprises an original message 210, electronic signature data 220, and a verification value 230. In the embodiment, the structure designed to transmit the message 210 and the electronic signature data 220 together is similar to that of the existing methods. Also, the scheme for guaranteeing the validity of an electronic signature data through the verification value 230 composed of a plurality of verification factors is in part similar to that of the existing methods; however, the novelty of the present disclosure lies in the method for generating, operating, and verifying the individual verification factors 231, 232, 233 comprising the verification value. An electronic signature message according to the present disclosure may be composed as shown in Eq. 4.

$$[m_n, \mathrm{Sig}_{SK_n}(m_n), (PK_n, y_n, z_n)] \qquad \text{[Eq. 4]}$$

The one-time electronic signature data generation algorithm Sig( ) using the message $m_n$ and the HBS signature algorithm may have the same or similar function in the prior art. The first verification factor 231 may be a public key $PK_n$ corresponding to $SK_n$ used to generate the electronic signature data. The second verification factor 232 and the third verification factor 233 are derived from an infinite hash chain connected according to a predetermined rule.

FIG. 3 illustrates generation of a verification value and a verification structure based on an infinite hash chain according to one embodiment of the present disclosure. FIG. 3(a) is related to a process of generating a verification value. In FIG. 3(a), t represents the flow of time, and n represents the time index of the message. The public key $PK_n$ generated in response to the message $m_n$ at the current time index and the public keys $PK_{n+1}$ and $PK_{n+2}$ generated in advance for the sequences to come in the future correspond to the values that may be generated according to the procedure by who performs an electronic signature. The present disclosure provides an infinite hash chain that employs the public key $PK_n$ at the current time index and/or $x_n$ generated based thereon as a first verification factor 231, $y_n$ generated based on the public key $PK_{n+1}$ at the next time index as a second verification factor 232, and $z_n$ generated based on both the public key $PK_{n+2}$ at the time index after the next and the public key $PK_{n+1}$ at the next time index as a third verification factor 233.

In other words, according to the present disclosure, any public key $PK_n$ guarantees connectivity to the public keys in the past (e.g., $PK_{n-1}$) and, at the same time, is guaranteed to be connected by the public keys in the future (e.g., $PK_{n+1}$). As described above, the combination of hash values $\{x_n, y_n, z_n\}$ derived according to the change of $PK_n$ may change infinitely in continuous values, which conforms to the concept of an infinite hash chain. Therefore, it is possible to match a one-time public key-private key pair to an infinitely continuous hash chain without matching to a bounded tree, thereby eliminating the upper limit of n existing in the conventional Merkle tree-based algorithm.

Figure 4:
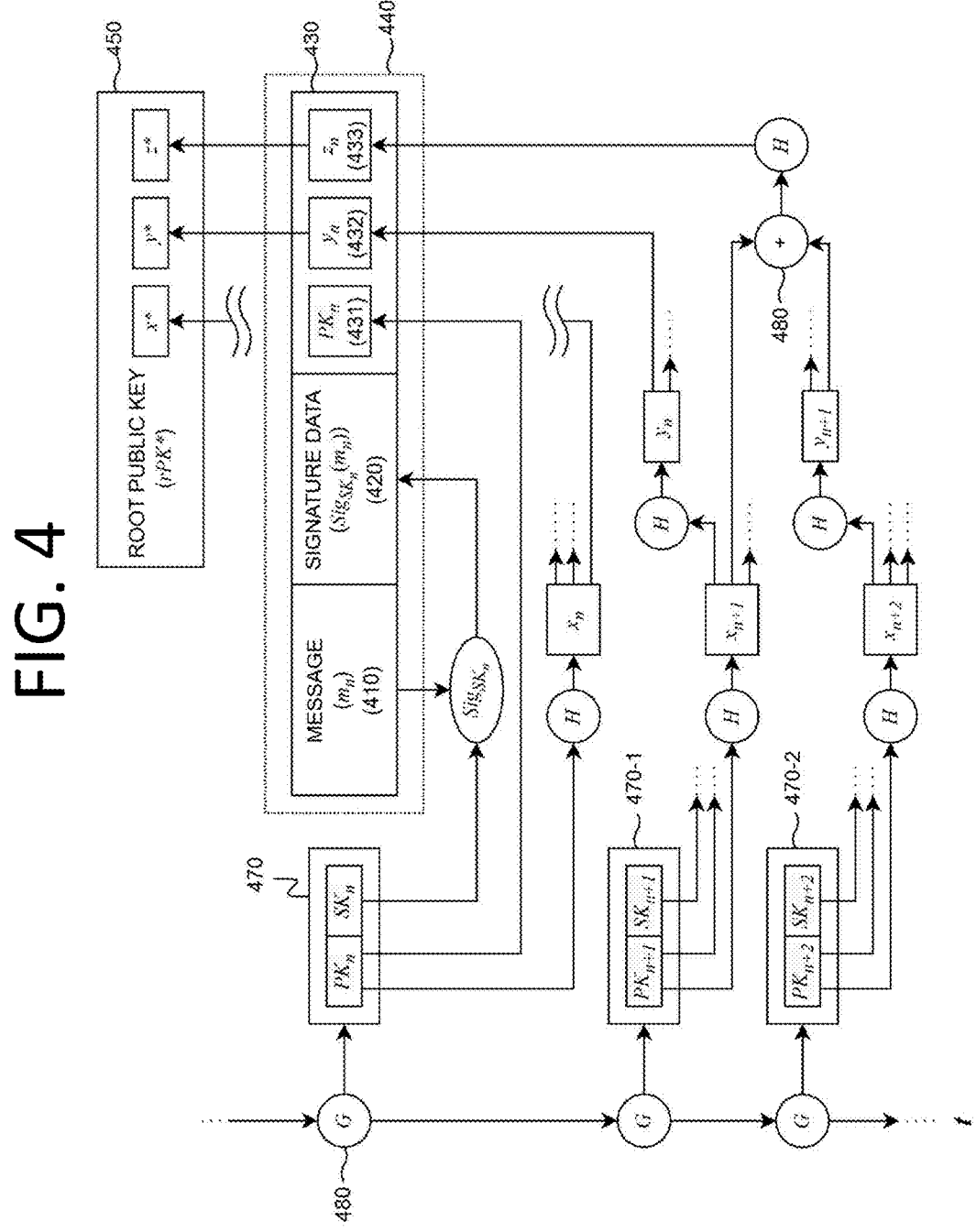
FIG. 4 illustrates a procedure for generating a message with an electronic signature according to one embodiment of the present disclosure.

FIG. 4 illustrates a procedure for generating a message with an electronic signature according to one embodiment of the present disclosure. As shown in FIG. 2, an electronically signed message 200, 440 according to one embodiment of the present disclosure may include a message 210, 410, electronic signature data 220, 420, and an electronic signature verification value 230, 430.

As described above, public key-private key pairs 470, 470-1, 470-2 may be sequentially generated according to the operation of the one-time public key-private key generation algorithm 480 in the time order t. In order to obtain the public key-private key pair, any algorithm for generating a known public key-private key pair may be used; any key algorithm may be applied to the present disclosure as long as the algorithm supports a structure in which one entity performing an electronic signature generates electronic signature data using a private key, and the other entity verifying the electronic signature verifies the electronic signature data using a distributed public key. For example, a public key-private key pair may be safely generated using the prime factorization algorithm used in the RSA or DSA, which are cryptographic methods according to the prior art. However, in a preferred embodiment of the present disclosure for securing post-quantum cryptography against quantum computers, a one-time public key-private key pair generation algorithm by a hash function-based HBS signature algorithm may be used.

In the public key-private key pair 470 at the current time index, the private key $SK_n$ may be calculated in conjunction with the message $m_n$ 410 as described above to generate electronic signature data 420 through the electronic signature function $\mathrm{Sig}_{SK_n}(m_n)$. While included in the verification value 430 as a first verification factor, the public key $PK_n$ may be used to obtain the value $x_n$ by applying the hash function H( ).

In the public key-private key pair 470-1 at the next time index in the order of time t, the private key $SK_{n+1}$ may be stored to be used for an electronic signature of the message $m_{n+1}$, and the public key $PK_{n+1}$ may be stored together but may be used to obtain the $y_n$ value. As shown in FIG. 3, $y_n$ may be obtained by applying a hash function again to $x_{n+1}$ obtained by applying the hash function to the $PK_{n+1}$.

In the public key-private key pair 470-2 at the time index after the next, the private key $SK_{n+2}$ may be stored to be used for an electronic signature of the message $m_{n+2}$ coming in the future, and the public key $PK_{n+2}$ may be stored together but may be used to obtain the $z_n$ value. As shown in FIG. 3, $z_n$ may be obtained by applying a hash function again to the merged value obtained by applying the merge operation 480 to $y_{n+1}$ generated by the procedure described above based on the $PK_{n+2}$ and $x_{n+1}$ generated by the procedure described above based on the $PK_{n+1}$.

The method of merge operation 480 may employ any operation as long as the employed operation derives a unique calculation result value through a merging of two values; preferably, an operation of a simple concatenation of two values may be applied. However, in addition to the specific example above, the method may employ addition, subtraction, bit-wise AND operation, OR operation, XOR operation, shift operation, or a merging function combining one or more of the listed operations, other logical operations, or mathematical operations; it is obvious that those skilled in the art may select various other methods in addition to the above.

According to the calculation result above, the electronic signature verification value 430 according to the present disclosure may include the public key $PK_n$ at the current time index as the first verification factor 431, $y_n$ as the second verification factor 432, and $z_n$ as the third verification factor 433. $x_n$ may be obtained only by applying a hash function to the public key $PK_n$; since $PK_n$ has to be transmitted for the purpose of verifying the electronic signature data generated based on the private key $SK_n$, it may be sufficient to include only $PK_n$ in the electronic signature message instead of using the $x_n$. However, depending on the embodiments of the present disclosure, it is still possible to include the $x_n$ and the $PK_n$ separately. In another embodiment of the present disclosure, when the generation of electronic signature data using the Sig( ) function and verification thereof using the Ver( ) function are not used, the electronic signature data 420 may be excluded from the electronic signature message 440, and $x_n$ may be used as the first verification factor 431 instead of $PK_n$.

After the electronically signed message 440 is generated, the entity performing the electronic signature may store the combination of the respective hash results, $\{x_n, y_n, z_n\}$, as a variable root public key $rPK^{(n)}=rPK*^{(n)}$ 450 at the time the n-th message is transmitted.

Figure 5:
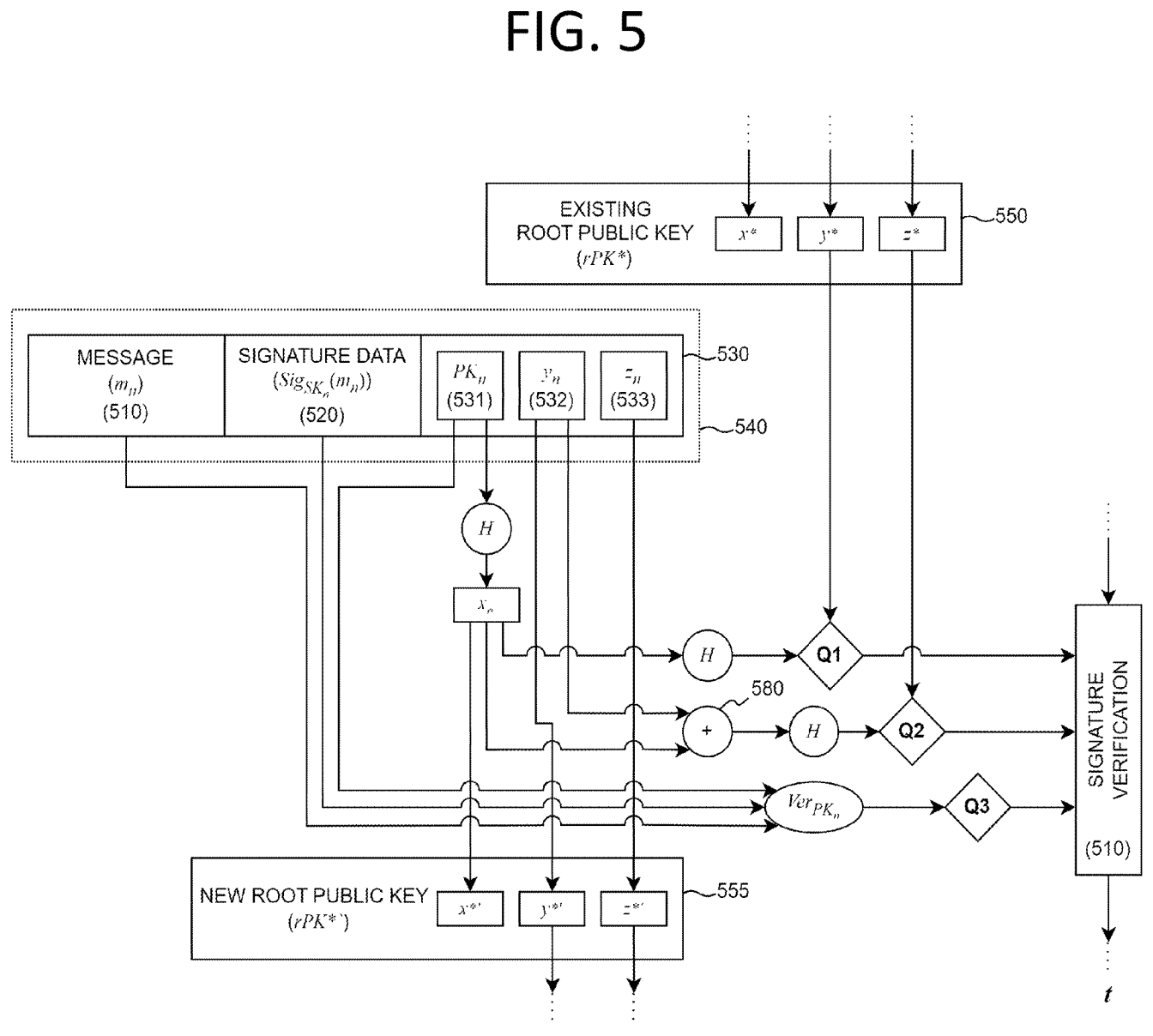

FIG. 5 illustrates a procedure for verifying a message with an electronic signature according to one embodiment of the present disclosure. As shown in FIGS. 2 and 4, the message 200, 440, 540 with an electronic signature according to one embodiment of the present disclosure may include a message 210, 410, 510, electronic signature data 220, 420, 520, and an electronic signature verification value 230, 430, 530.

The electronic signature data 520 generated through Sig( ) may be verified Q3 by the one-time electronic signature data verification algorithm Ver( ) based on the HBS signature algorithm. The algorithm corresponding to Ver( ) may have the same or similar function as the one used in the prior art. For the verification, the message $m_n$ 510, for which an electronic signature is applied, and the public key $PK_n$ 531 transmitted as the first verification factor may be put into the Ver( ) function.

According to the embodiment of the present disclosure, the verification Q3 of the electronic signature data 520 may be performed before the verification operation using the second verification factor 532 and the third verification factor 533 described later or performed sequentially or in parallel; the verification may be performed in any order as long as it forms part of the signature verification procedure. Alternatively, as illustrated in FIG. 4, depending on the embodiments of the present disclosure, instead of generating electronic signature data using the Sig( ) function and verifying the electronic signature data using the Ver( )

function, the validity of a message may be verified using only the second verification factor 532 and the third verification factor 533.

According to one embodiment of the present disclosure, the second verification factor 532 and the third verification factor 533 may be utilized to verify whether the electronic signature is valid. This operation corresponds to the process for verifying the verification value shown in FIG. 3(*b*).

The entity verifying an electronic signature may store an existing variable root public key $rPK*=\{x*, y*, z*\}$ 550. To verify a message with an electronic signature, a verification factor attached to the message is compared with each root factor constituting the root public key.

The root factor $y*$ may be compared Q1 to see if it is the same as the value obtained by applying a hash function again to $x_n$ obtained by applying the hash function to the first verification factor $PK_n$ 531; the root factor $z*$may be compared Q2 to see if it is the same as the value obtained by applying the hash function again to the value obtained by applying a merge operation 580 to the $x_n$ and the second verification factor $y_n$ 532. The method of the merge operation 580 is the same as that described above for the merge operation 480 of FIG. 4, except that the entity performing an electronic signature and the entity verifying the electronic signature use the same method to obtain the same result value.

Suppose each root factor of the existing variable root public key 550 is $\{x_{n-1}) y_{n-1}, z_{n-1}\}$, which is a value based on a verification factor transmitted earlier in time through a message with an electronic signature. In that case, it may be verified that the message $m_n$ 540 electronically signed using the method above originates from the same sender authorized for the message $m_n\_1$ with an electronic signature at the previous time index. The above feature may be easily understood from the fact that each factor in FIGS. 3(*a*) and (*b*) is the same.

If the comparison of the verification factors Q1, Q2 and the verification Q3 of the message with an electronic image using Ver( ) function are all true, the electronic signature of the message may be determined to be verified entirely 510.

Also, to verify the electronic signature at the next time index, the stored root public key may be updated. Since $x_n$, $y_n$, and $z_n$ were obtained at the previous time index, and the connection relationship by the hash function with the existing root public key $\{x*, y*, z*\}$ obtained at the previous time index was also verified, the root public key may be updated to $\{x_n' y_n, z_n\}$ 555. Through this operation, it is possible to verify the updated root public key again from the verification factor $\{PK_{n-1}, y_{n-1}, z_{n-1}\}$ attached to the message with an electronic signature at the next time index.

The combination $\{x_n, y_n, z_n\}$ composed of the respective verification values may be used as a variable root public key rPK (n) at the time the n-th message is transmitted. As described above, the entity performing an electronic signature may obtain the root public key $\{x_n, y_n, z_n\}$ by applying the electronic signature to the message $m_n$ using the public key $PK_n$, and the entity verifying the electronic signature may update the root public key to a combination $\{x_n, y_n, z_n\}$ generated using the public key $PK_n$, and the verification value $\{y_n, z_n\}$ after completing the verification of the message $m_n$. In other words, since the entity performing an electronic signature and the entity verifying the electronic signature always use the same variable root public key each time a message is transmitted, the limitation of the prior art that a root public key has to be securely distributed may be overcome. In particular, this feature of the present disclosure makes one expect additional security benefits when the present disclosure is operated in conjunction with other algorithms and technology systems that synchronize both entities using the root public key.

Procedure for Performing and Verifying an Electronic Signature

The procedure for performing and verifying an electronic signature according to the present disclosure will be described in more detail with reference to a related flow diagram.

Figure 6:
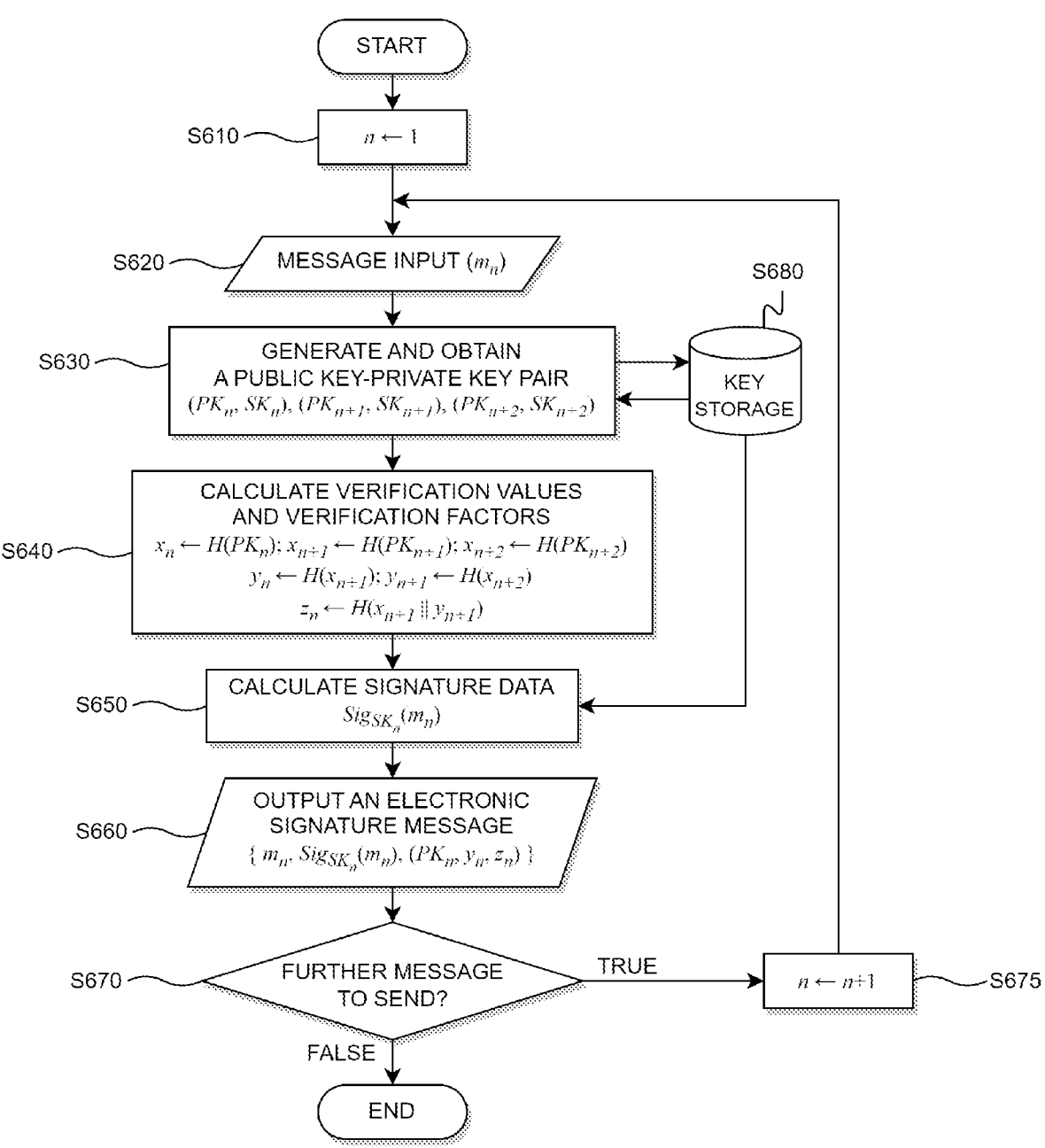
FIG. 6 is a flow diagram illustrating a procedure for performing an electronic signature according to one embodiment of the present disclosure.

FIG. 6 is a flow diagram illustrating a procedure for performing an electronic signature according to one embodiment of the present disclosure. The flow diagram of FIG. 6 illustrates a process of transmitting an arbitrary number of messages $m_n$ securely using an infinite hash chain-based electronic signature according to the present disclosure. The entire process may be started after initializing the value n representing the order of a message. When the message $m_n$ is received S620, it may be configured to obtain a public key-private key pair for transmitting the corresponding message S630.

As described in detail with reference to FIG. 4, according to one embodiment of the present disclosure, three one-time public key-private key pairs may have to be obtained to attach an electronic signature to the message $m_n$ S630. To generate a verification factor of the electronic signature verification value according to the present disclosure, public keys down to the time index two steps before the time index of a current message to be sent may be required. In other words, $PK_n$, $PK_{n+1}$, and $PK_{n+2}$ may all have to be acquired. Since the corresponding private key has also to be generated to generate each public key, the one-time public key-private key pair generation algorithm may be operated as many times as needed.

In one embodiment of the present disclosure, after being generated, the public key-private key pair may be stored in a key storage S680 and used sequentially. For example, since at least public keys $PK_1$, $PK_2$, and $PK_3$ have to be obtained to generate an electronic signature verification factor for message $m_1$, the public keys may be generated and then stored in the key storage S680. By utilizing the storage S680, when it is desired to obtain public keys $PK_2$, $PK_3$, and $PK_4$ to sign the message $m_2$ next electronically, $PK_2$ and $PK_3$ do not need to be newly generated but may be retrieved from the existing storage S680. Also, since a plurality of private keys $SK_n$ are inevitably obtained from the process of generating a plurality of public keys $PK_n$ as described above, the private keys may be stored in the storage S680 and then used in the proper order.

After the required public keys are obtained, hash values for generating a verification value may be generated through calculation S640, through which the second verification factor $y_n$ and the third verification factor $z_n$ may also be generated. The calculation procedure is illustrated by mathematical expressions in the flow diagram of FIG. 6, which has been described above with reference to FIG. 4.

Also, the Sig( ) function may calculate S650 electronic signature data. The private key $SK_n$ may be used for the electronic signature, where the private key may have been generated or acquired in the public key-private key pair generation step S630 above and may be retrieved from the storage S680.

While it is clear that all the steps shown in FIG. 6 are not subject to a strict sequence, the S640 and S650 steps, in particular, do not necessarily have to be executed sequentially; for example, in one embodiment of the present disclosure, the S650 step may be executed before the S640 step. In another embodiment of the present disclosure, the S640 and S650 steps may be executed in parallel. In yet another embodiment of the present disclosure, the S650 step may not be required because verification of a message with electronic signature data using the Sig( ) and Ver( ) functions is not used.

When the S640 and/or S650 step generates information for configuring a message with an electronic signature, the message with an electronic signature may be output S660. The information configuration of the message with an electronic signature may have the same form as that of the electronically signed message shown in FIGS. 2, 4, and 5. When there is a further message to be transmitted after the electronically signed message is output as described above S670, the time index n of the message is increased by 1 S675, and the electronic signature procedure proceeds to the next message.

Figure 7:
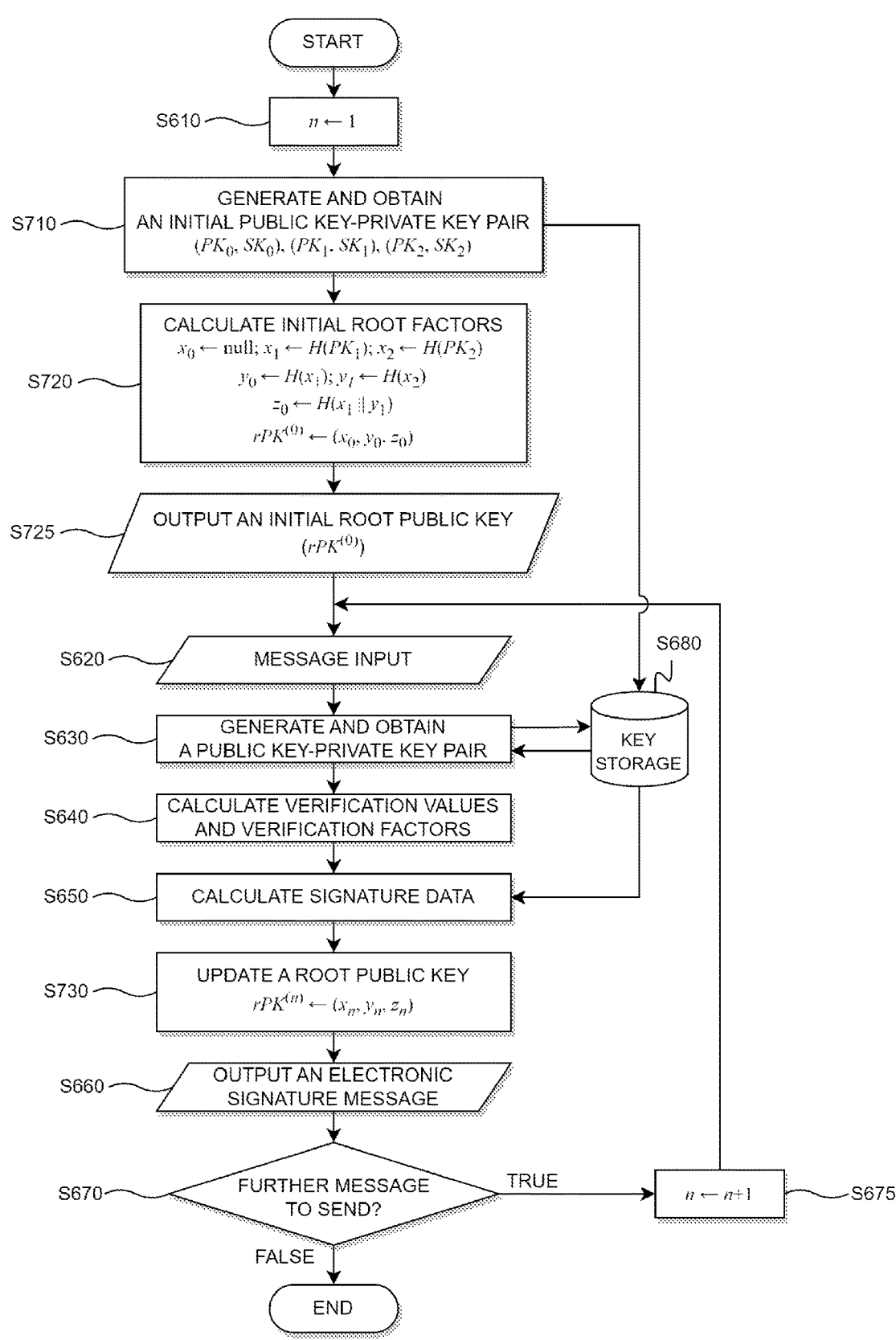
FIG. 7 is a flow diagram illustrating a more detailed procedure for performing an electronic signature according to one embodiment of the present disclosure.

FIG. 7 is a flow diagram illustrating a more detailed procedure for performing an electronic signature according to one embodiment of the present disclosure. For the steps overlapping those already described in FIG. 6, only part of the steps will be described, or descriptions thereof will be omitted.

FIG. 7 elaborates on a procedure that may be additionally required in the electronic signature procedure according to the present disclosure. Referring to FIG. 7, in addition to the initialization of the electronic signature procedure, initializing the time index n S610, obtaining an initial public key pair S710, and calculating an initial root factor S720 may be included. As described above with reference to FIG. 4, public keys up to the time index two steps ahead of the current index may be required to generate an electronic signature verification value according to the present disclosure. Also, an initial root factor value required by the entity verifying an electronic signature of the initial message $m_1$ may be requested. Therefore, the S710 step may generate a public key-private key pair including at least three public keys such as $PK_0$, $PK_1$, and $PK_2$, and the S720 step may calculate a root factor $\{x_0, y_0, z_0\}$ belonging to the initial value $rPK^{(0)}$ based on the at least three public keys. In the S720 step, $x_0$ among the initial root factors may be defined as $H(PK_0)$ obtained by taking the hash value of $PK_0$; since the definition above does not affect performing and verifying an electronic signature, the $x_0$ may not be included in the initial root value $rPK^{(0)}$, or the $x_0$ may be set to an empty initial value such as 0 or null.

After the initial root public key $rPK^{(0)}$ is determined as described above, the initial root value may be output and distributed to a receiving terminal for verifying an electronic signature S725. After the S725 step distributes the root public key for the first time, as described above, the root public keys of the signing and verifying entities, which are variable root public keys, may be synchronized each time a message is verified. The updating the root public key $rPK^{(n)}$ by an entity performing an electronic signature to the root factor $\{x_n, y_n, z_n\}$ S730 may be executed in any order as long as the updating is performed consecutively after the calculating the verification value S640. According to one embodiment of the present disclosure, the S730 step may be performed after the S640, S650, or S660 step or in parallel with each step.

Figure 8:
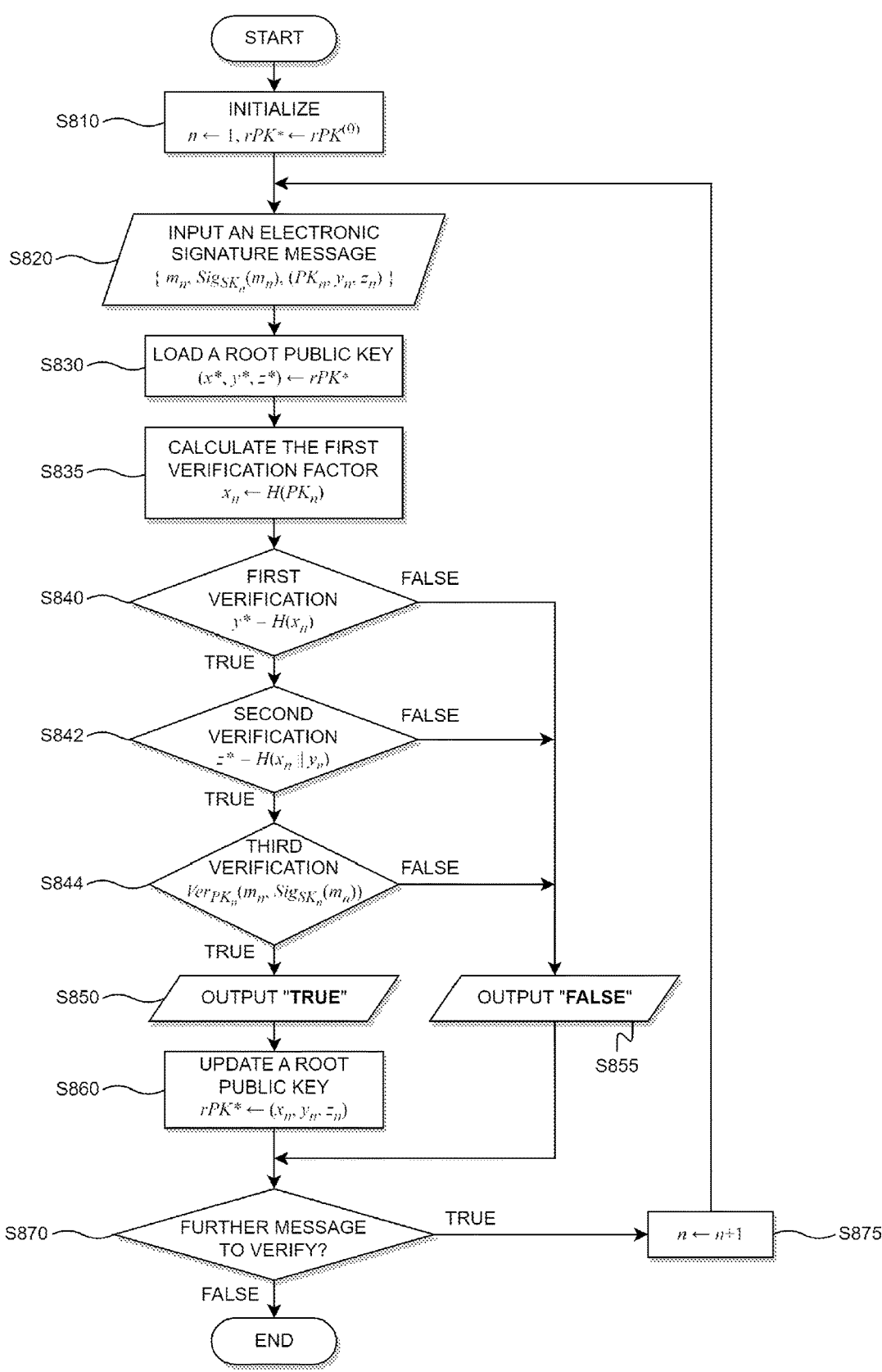
FIG. 8 is a flow diagram illustrating a procedure for verifying an electronic signature according to one embodiment of the present disclosure.

FIG. 8 is a flow diagram illustrating a procedure for verifying an electronic signature according to one embodiment of the present disclosure. The flow diagram of FIG. 8 illustrates a process of transmitting an arbitrary number of messages $m_n$ securely using an infinite hash chain-based electronic signature according to the present disclosure. Before the verification procedure is executed, the verifying entity may perform initialization S810. The initialization step S810 may include initializing the time index n of a received message to 1 and initializing the root public key rPK* to the initial root public key $rPK^{(0)}$ distributed by the entity performing an electronic signature. According to the embodiment of the present disclosure, the procedure of initializing n to 1 may be omitted, which is based on the fact that the verification of an electronic signature message verification value according to the present disclosure operates using only a given verification value and a stored root public key regardless of the time index.

After the initialization is performed, a message with an electronic signature may be input S820. The message with an electronic signature may include a message $m_n$, electronic signature data $Sig_{SK_n}(m_n)$, and a verification value $\{PK_n, y_n, z_n\}$ composed of the first to third verification factors. The configuration of the message with an electronic signature may have the same form as that shown in FIGS. 2, 4, and 5, and the electronically signed message may be the message obtained by inputting a message with an electronic signature output from the S660 step in the descriptions of FIGS. 6 and 7.

In one embodiment of the present disclosure, the root factor $\{x^*, y^*, z^*\}$ may be retrieved from the root public key rPK* stored for verification S830. As described above with reference to FIG. 5, according to one embodiment of the present disclosure, a comparison between the root factor and the calculation result of an electronic signature verification value may be required to verify an electronically signed message $m_n$ according to the present invention.

The process of verifying a message with an electronic signature may proceed from the S835 to S844 steps of FIG. 8. While it is clear that all the steps shown in FIG. 6 are not subject to a strict sequence, each of the steps, in particular, may be executed in any order or in parallel unless there exists a dependence between the steps.

In the S835 step, the value $x_n$ may be calculated from the first verification factor $PK_n$. Subsequently, a first verifying step S840 based on the $x_n$ may be executed. In the first verifying step S840, according to one embodiment of the present disclosure, it is possible to compare whether $H(x_n)$, which is the result obtained by taking the hash function of $x_n$, is the same as $y^*$ among the stored root factors. This operation may correspond to the comparison procedure of symbol Q1 in the description of FIG. 5. If $H(x_n)$ is not the same as $y^*$, it may be considered that verification has failed S855.

In the second verifying step S842, $H(x_n\|y_n)$, which is a value generated by applying a hash function again on the value obtained by merging $x_n$ generated based on the first verification factor and the second verification factor $y_n$, may be compared to see if it is the same as $z^*$ among the stored root factors. This operation may correspond to the comparison procedure of symbol Q2 in the description of FIG. 5. If $H(x_n\|y_n)$ is not the same as $z^*$, it may be considered that verification has failed S855. The method of the merge operation is the same as that described above for the merge operation 480 of FIG. 4, except that the entity performing an electronic signature and the entity verifying the electronic signature use the same method to obtain the same result value.

The third verifying step S844 may verify electronic signature data 520 generated through Sig( ) using the one-time electronic signature data verification algorithm Ver( ) based on the HBS signature algorithm. This operation may correspond to the comparison procedure of symbol Q3 in the description of FIG. 5. If the verification does not yield the same data, it may be considered that verification has failed S855. As illustrated in FIG. 4, depending on the embodiments of the present disclosure, the generation of electronic signature data using the Sig( ) function and verification of the electronic signature data using the Ver( ) function may not be used; thus, the third verifying step S844 may not be required.

Figure 9:
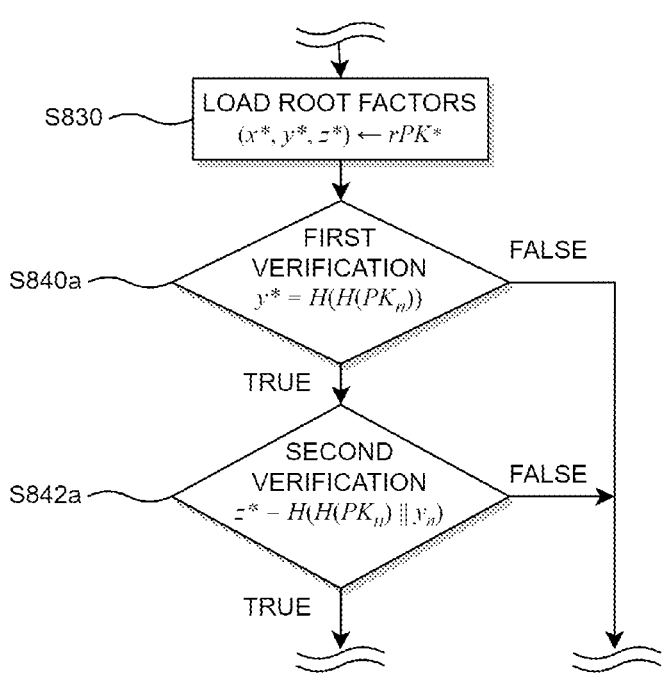
FIG. 9 shows alternative notations of the flow diagram illustrating a procedure for verifying an electronic signature according to one embodiment of the present disclosure.

The first verifying step S840 and the second verifying step S842 may be expressed as shown in the S840a and S842a steps of FIG. 9 when the procedure is expressed using only the verification factor transmitted together with a message with an electronic signature. FIG. 9 shows alternative notations of the flow diagram illustrating a procedure for verifying an electronic signature according to one embodiment of the present disclosure, where the first verifying step S840, S840a may be regarded as a procedure for checking whether the root factor $\gamma^*$ is the same as $H(H(PK_n))$, and the second verifying step S842, S842a may be regarded as a procedure for checking whether the root factor $z^*$ is the same as $H(H(PK_n)\|y_n)$.

When all of the first to third verifying steps S840, S842, S844 have succeeded in verification S850, it is determined that the electronic signature of the message $m_n$ has been fully verified, and a procedure for normally receiving and accepting the original message $m_n$ may proceed. Also, the stored root public key may be updated to verify the next electronic signature. Since $x_n$, $y_n$, and $z_n$ were obtained above, and the connection relationship by the hash function with the existing root public key $\{x^*, y^*, z^*\}$ obtained at the previous time index has also been verified, the root public key may be updated to $\{x_n, y_n, z_n\}$ S860. Through this operation, it is possible to verify the updated root public key again from the verification factor $\{PK_{n-1}, y_{n-1}, z_{n-1}\}$ attached to the message with an electronic signature at the next time index.

When there is a further message to be transmitted after the electronically signed message is verified as described above S870, the time index n of the message is increased by 1 S875, and the electronic signature verification procedure proceeds to the next message.

Embodiment of System and Apparatus

The procedure for performing and verifying an electronic signature according to the present disclosure will be described in more detail with an embodiment of a system and an apparatus for transmitting and receiving terminals.

Figure 10:
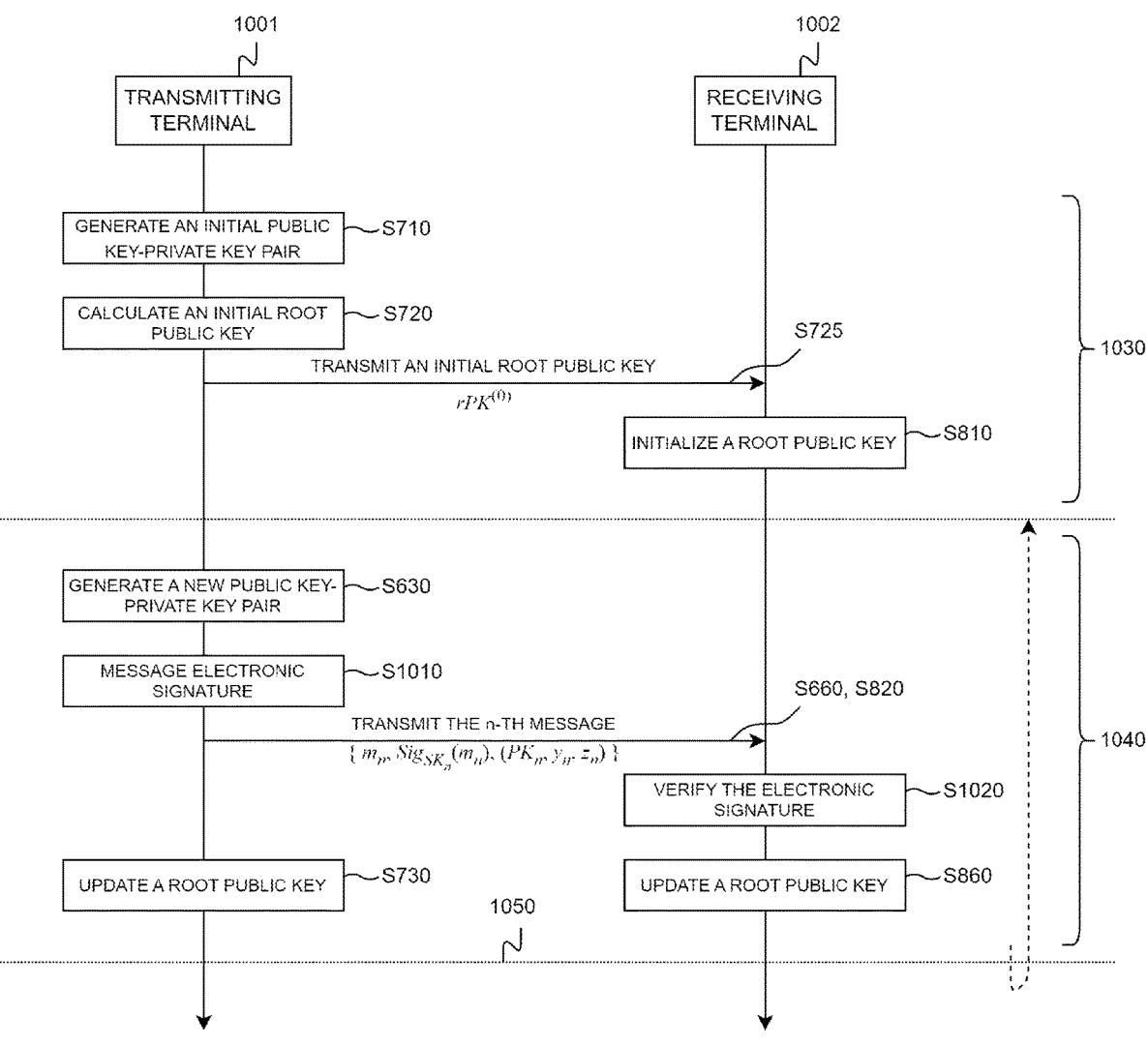
FIG. 10 is a communication concept illustrating a case when a process for applying and verifying an electronic signature is applied to a transceiver system according to one embodiment of the present disclosure.

FIG. 10 is a communication concept illustrating a case when a process for applying and verifying an electronic signature is applied to a transceiver system according to one embodiment of the present disclosure. The transmitting terminal 1001 is an entity performing an electronic signature, which may be a device performing the procedure and/or the steps shown in FIGS. 4, 6, and 7. The receiving terminal 1002 is an entity verifying an electronic signature, which may be a device performing the procedure and/or the steps shown in FIGS. 5, 8, and 9.

In the initialization process 1030, the transmitting terminal 1001 may perform initialization by executing the generation of an initial public key and private key pair S710, calculating an initial root public key S720, and transmitting the initial root public key to the receiving terminal S725. Upon receiving the initial root public key, the receiving terminal 1002 may initialize a stored root public key using the received initial public root key S810.

Afterward, the process for transmitting and receiving a message 1040 may be continuously repeated. For each message transmission, the transmitting terminal 1001 may generate a new public key-private key pair S630 and apply an electronic signature to the message S1010. The S1010 step may be interpreted as including the S620, S640, and S650 steps shown in FIG. 6 or 7 sequentially or in parallel.

When the electronic signature is completed, the electronically signed message is transmitted S660. The transmitted message with the electronic signature may be interpreted to be the same as the message 200 shown in FIG. 2. When the message is successfully transmitted, the transmitting terminal 1001 may be configured to update the root public key S730.

The receiving terminal 1002 may receive the electronically signed message S820 and verify the electronically signed message S1020. The S1020 step may be interpreted as including the S830, S835, S840, S842, and S844 steps shown in FIG. 8 sequentially or in parallel. When the electronic signature is verified, the receiving terminal 1002 may be configured to update the root public key S860.

Through the description of FIG. 10, it may be easily understood how an entity performing an electronic signature is connected to an entity verifying the electronic signature and how synchronization of root public keys between them is performed.

Figure 11:
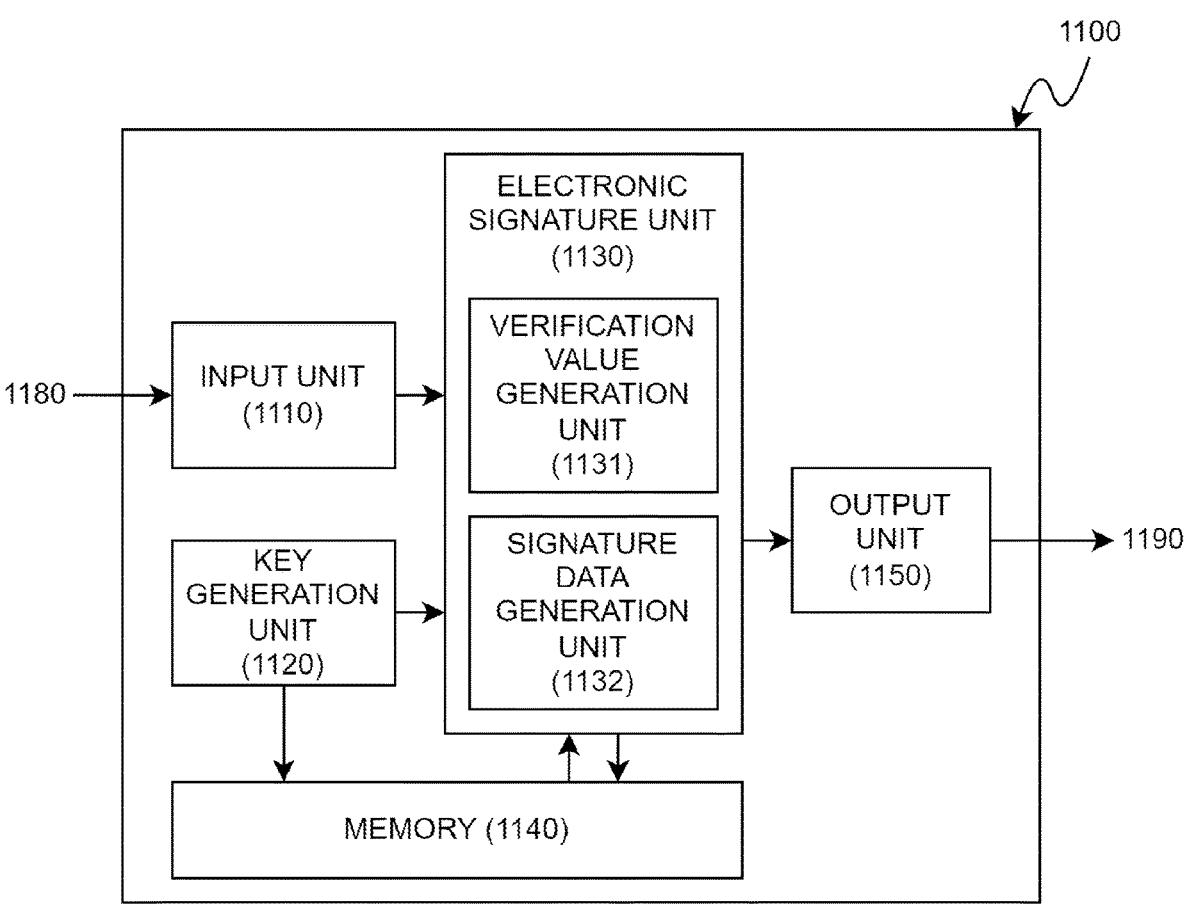
FIG. 11 is a block diagram of a transmitting terminal performing an electronic signature according to one embodiment of the present disclosure.

FIG. 11 is a block diagram of a transmitting terminal performing an electronic signature according to one embodiment of the present disclosure. The transmitting terminal 1100 may correspond to the transmitting terminal 1001 of FIG. 10. The transmitting terminal 1100 may comprise an input unit 1110 receiving a message 1180 with an electronic signature, a key generation unit 1120 generating a plurality of public key-private key pairs, a memory 1140 for storing and returning key pairs generated by the key generation unit, an electronic signature unit 1130 generating electronic signature data and/or a signature verification value for the message based on the key pairs generated by the key generation unit, and an output unit 1150 outputting 1190 the message and the signature verification value. The electronic signature unit 1130 may include a verification value generation unit 1131 generating at least one verification factor generated through a hash function based on the different public keys or a value obtained by merging the different public keys and a signature data generation unit 1132 generating electronic signature data for the message 1180 by the Sig( ) function using the private keys generated by the key generation unit 1120.

Figure 12:
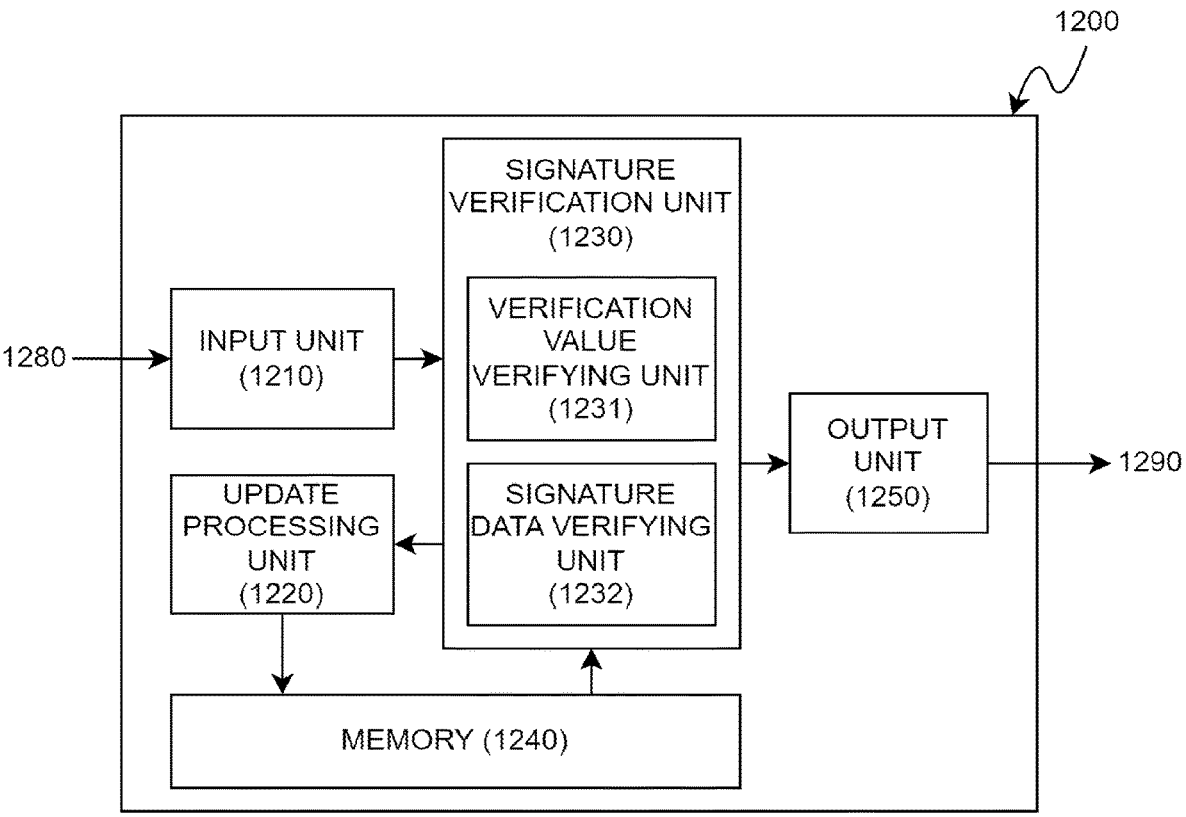
FIG. 12 is a block diagram of a receiving terminal performing verification of an electronic signature according to one embodiment of the present disclosure.

FIG. 12 is a block diagram of a receiving terminal performing verification of an electronic signature according to one embodiment of the present disclosure. The receiving terminal 1200 may correspond to the receiving terminal 1002 of FIG. 10. The receiving terminal 1200 may comprise an input unit 1210 receiving data 1280 for verifying an electronic data, a memory 1240 storing a root verification value including at least one root factor, a verification unit 1230 determining that the message is verified when a predetermined electronic signature verification procedure is satisfied, an output unit 1250 outputting the verification result, and an update processing unit updating each of the at least one root factor to a value generated based on the at least one verification factor according to the verification result. The verification unit 1230 may include a verification value verifying unit 1231 retrieving the root verification value from the memory and checking whether each of the at least one root factor is the same as a value generated based on the different verification factors or a value obtained by merging the different verification factors and a signature data verifying unit 1232 verifying the electronic signature data included in the memory 1280 by the Ver( ) function using the public keys included in the verification factor.

Other Modified Embodiments

In this document, the present disclosure has been described with reference to appended drawings and embodiments, but the technical scope of the present disclosure is not limited to the drawings or embodiments. Rather, it should be understood by those skilled in the art to which the present disclosure belongs that the present disclosure may be modified or changed in various ways without departing from the technical principles and scope of the present disclosure disclosed by the appended claims below. In what follows, some modified embodiments of the present disclosure will be described illustratively, and the possibility of implementing modified embodiments of the present disclosure is not limited to the modified embodiments described below.

FIG. 13 is a conceptual diagram illustrating generation of a verification value and a verification structure based on an infinite hash chain according to one embodiment of the present disclosure. FIG. 13 shows an embodiment in which a total of four types of hash values, such as x, y, z, and w, are used as a verification factor and a root factor of a root public key. According to the embodiment of FIG. 13, $w_n$ may be defined as $H(y_{n+1}||z_{n+1})$, and finally as $H(H(H(PK_{n+2})||H(H(H(PK_{n+2})||H(H(PK_{n+3})))$ In other words, in the description of the present disclosure above, three types of hash values have been mainly described, which is simply an embodiment to help understand the operation structure; four types of hash values may be used as shown in FIG. 13, or although not shown in the figure, five or more types of hash values may still be used. Further, two types of hash values that exclude $z_n$ may be used depending on the needs.

Furthermore, the hash value may still be obtained as long as it is configured through a public key over multiple indices and/or by merging of public keys through multiple indices, and the merging method may vary according to the embodiment. For example, in an embodiment in which the hash value w is further utilized as shown in FIG. 13, it should be obvious that the embodiment sill belongs to the technical scope of the present disclosure even if $w_n$ is used after being modified to $H(x_{n+1}||y_{n+1}||z_{n+1})$.

FIG. 14 is a conceptual diagram illustrating generation of a verification value and a verification structure based on an infinite hash chain according to an additionally modified embodiment of the present disclosure. FIG. 14 illustrates a case in which n is included in a root public key as an auxiliary value to support a verification procedure according to the time index of a verification factor. For example, when a message $m_{n-1}$ with an electronic signature including information on $rPK^{(n-1)}$ is not properly transmitted to a receiving terminal due to an error 1410, the receiving terminal storing $rPK^{(n-2)}$ as a root public key may not verify an incoming message with an electronic signature. To prevent the above case from happening, the time index n of a current message may be transmitted by being included in the message with an electronic signature. The receiving terminal may be configured to compare the pre-stored time index n−2 with a newly received time index n 1420, determine that the continuity of information has been broken if the time index is not consecutive, and take proper action. For example, the action may include requesting retransmission of the message at the (n−1)-th time index or requesting re-initialization of a communication procedure; however, to avoid being abused by a third party's interceptive attack to ruin communication security, more advanced measures may be applied. For example, by using a plurality of infinite hash chains according to the present disclosure at different cycles, continuity from an existing message may be verified using another infinite hash chain, even if verification fails for one infinite hash chain.

So far, partially modified, predictable embodiments of the present disclosure have been described; however, as described above, the possibility of implementing modified embodiments of the present disclosure is not limited to the modified embodiments described with reference to FIG. 13 or 14, and it should be clearly understood that all modified embodiments fall within the technical scope of the present disclosure if they employ a structure which implements comparison and synchronization with a root public key using an infinite hash chain.

Descriptions and embodiments included in the disclosure described above or related to the subsequent disclosure will be provided below.

Additional Descriptions on the Background

Number-theoretic problems hard to solve, such as the "prime factorization problem" and the "discrete logarithm problem" may be called "mathematical challenges." Because some mathematical problems including the above examples are highly challenging to solve compared to creating the problems, electronic signature methods such as RSA, DSA, and ECDSA have been designed. However, the performance of the conventional methods may be rendered uncompetitive due to the recent advances in quantum computing technology. For example, according to the algorithm of P. W. Shor (1994), it has been demonstrated that the above mathematical challenges could be solved within a polynomial time when a quantum computer is employed. (P. W. Shor, "Algorithms for quantum computation: discrete logarithms and factoring," In Proc. Annual Symposium on Foundations of Computer Science, pp. 124-134, 1994.)

In this regard, one of the emerging methods for electronic signatures (so-called post-quantum signatures) in the era of quantum computing is a hash-based signature (HBS). HBS is designed based on a cryptographic hash function of which the safety has been proven for a long time and has the advantage that signature generation and signature verification, in particular, may be performed very efficiently. However, the signature size of the HBS based on the prior art is longer than that of the existing electronic signature method.

In what follows, a basic signature scheme based on the HBS and an extension scheme will be described.

The HBS method may include the basic electronic signature scheme and the extended electronic signature scheme. Conventional methods based on the basic electronic signature scheme include Lamport-Diffie one-time signature (LD-OTS; the "Lamport algorithm" described above) by Lamport (1979), Winternitz one-time signature described in the disclosure of R. C. Merkle (1990) (W-OTS; the "Winternitz algorithm" described above), and HORS few-time signature (HORS-FTS) disclosed by L. Reyzin et al. (2002). (L. Lamport, "Constructing digital signatures from a one-way function," SRI International, Palo Alto, Menlo Park, CA, USA, Rep. CSL-98, 1979.; R. C. Merkle, "A certified digital signature," Advances in Cryptology-CRYPTO'89, LNCS, volume 435, pp. 218-238, Springer-Verlag, 1990.; L. Reyzin and N. Reyzin, "Better than BiBa: Short one-time signatures with fast signing and verifying," In Proc. 7th Australian Conf. on Information Security and Privacy, pp. 144-153, Melbourne, Australia, Jul. 3-5, 2002.)

The basic electronic signature method may be a concept including a one-time signature (OTS) or a few-time signature (FTS) repeatedly used temporarily; thus, the basic electronic signature will be referred to as OTS/FTS in the following description.

The private key for signature generation and public key for signature verification of the OTS/FTS may be used only once (one-time, OTS) or temporarily several times (few-time, FTS). Therefore, for continual use (i.e., many-time repeated use), each time a message needs to be signed, a signer has to generate a new OTS/FTS key pair, and the OTS/FTS public key has to be delivered to a signature verifier in a way that ensures integrity. However, when multiple signature verifiers are involved, pre-distributing a new OTS/FTS public key each time to the multiple signature verifiers in a secure way that ensures integrity may cause difficulty and inefficiency.

An extended electronic signature method may be used to overcome the problem above. In other words, even if multiple OTS/FTS key pairs are used, the extended scheme distributes only one extended public key to signature verifiers in advance, thereby providing a structure that may verify multiple OTS/FTS electronic signatures. Examples of the extended electronic signature methods in the prior art include MSS described in the disclosure of R. C. Merkle (1990), XMSS described in the disclosure of A. Hulsing et al. (2018), SPHINCS described in the disclosure of D. J. Bernstein et al. (2015), and variations thereof. (R. C. Merkle, "A certified digital signature," Advances in Cryptology-CRYPTO'89, LNCS, volume 435, pp. 218-238, Springer-Verlag, 1990.; A. Hülsing, D. Butlin, S. Gazdag, J Rijneveld, and A. Mohaisen, "XMSS: extended Merkle Signature Algorithm," IRTF RFC 8391, Informational, ISSN: 2070-1721 May. 2018.; D. J. Bernstein, D. Hopwood, A. Hülsing, T. Lange, R Niederhagen, L. Papachristodoulou, M. Schneider, P. Schwabe, Z. Wilcox-O'Hearn, "SPHINCS: practical stateless hash-based signatures," Advances in Cryptology-EUROCRYPT 2015, LNCS, volume 9056, pp. 368-397, Springer-Verlag, 2015.)

The conventional extended electronic signature methods are designed based on a Merkle Tree. The Merkle tree-based extended electronic signature method may be referred to as a "tree-based electronic signature method." The tree-based electronic signature method may include constructing a tree based on a plurality of OTS/FTS key pairs to derive the extended public key.

A method for generating leaf nodes and inner nodes to be included in the tree may include performing calculations using functions defined by Eqs. 5 and 6 below.

$$H:\{0,1\}^* \rightarrow \{0,1\}^\ell \text{ for } \ell \in \mathbb{N} \qquad \text{[Eq. 5]}$$

Eq. 5 above represents a collision-resistant hash function H, which may indicate a function receiving a set of 0s or 1s (e.g., the set may be, but is not limited to, a binary bit sequence) having an arbitrary length (*) and deriving a set of 0s or 1s having a length $\ell$, which is a natural number $\mathbb{N}$ (similarly, the set may be, but is not limited to, a binary bit sequence). Also, the collision resistance may mean the property that a method faster than a brute-force attack at a mathematically significant level is not allowed to find a case where the results of the hash function H calculated from two different inputs are the same; therefore, the hash function H may correspond to such a hash function mathematically proven to be difficult to obtain the same output by forging an input to the hash function.

When the hash function His written in the form of $H^b(.)$, it may mean that the collision-resistant hash function H is applied iteratively as many times as b, which is equal to or greater than 1.

$$\hat{H}:\{0,1\}^{\ell\,t}\rightarrow\{0,1\}^{\ell}\ \text{for}\ ^{\ell}\,_{,t\epsilon}\mathbb{N} \qquad \text{[Eq. 6]}$$

Eq. 6 above represents a compression function $\hat{H}$. The compression function may include an operation of compressing and converting an input set of which the length may be defined as $^{\ell}$ t, which is a product of natural numbers $\mathbb{N}$, into an output set having a length $^{\ell}$. Depending on the embodiment, the compression function may include the functionality of a hash function H. Therefore, the compression function may act as the collision-resistant hash function at the same time.

According to an embodiment, the following two functions may perform a method for generating and verifying an OTS/FTS electronic signature.

The electronic signature generation function SIG(.) may represent, for example, an operation for generating an electronic signature based on the OTS/FTS including the LD-OTS, W-OTS, or HORS-FTS. In the electronic signature generation function, for j, which is an integer greater than or equal to 1, an electronic signature for the j-th message $m_j$, which is to be electronically signed, may be defined by Eq. 7 below.

$$SIG_{SK_j}(H(m_j)) \qquad \text{[Eq. 7]}$$

In Eq. 7, $SK_j$ may mean the j-th private key based on the OTS/FTS.

The electronic signature verification function VER(.) may represent, for example, an operation for verifying an electronic signature based on the OTS/FTS including the LD-OTS, W-OTS, or HORS-FTS and deriving a result of true (i.e., verified) or false (i.e., failed to verify). In the electronic signature verification function, for j, which is an integer greater than or equal to 1, whether an electronic signature for the j-th message $m_j$ is verified may be defined by Eq. 8 below.

$$VER_{PK_j}(m_j,SIG_{SK_j}(H(m_j)) \qquad \text{[Eq. 8]}$$

In Eq. 8, $PK_j$ may mean the j-th public key based on the OTS/FTS.

FIG. 15 is an additional conceptual diagram illustrating a method for electronic signature based on a hash function according to the prior art. The disclosure of FIG. 15 and the description thereof may be understood to be similar to that of FIG. 1 and the description thereof but may be understood as a more extended or additional description.

The conventional HBS operation method based on FIG. 15 may include initialization, signature generation, and signature verification steps.

In what follows, the initialization step will be described. As shown in FIG. 15, $2^N$ key pairs ($PK_j$, $SK_j$) composed of a one-time public key set-private key set may be generated to construct a hash tree having a depth or height of N. In each of the key pairs $PK_j$ and $SK_j$, j may mean a sequence ranging from 1 to $2^N$. In other words, the key pair may be repeatedly generated as many times as a number dependent on the depth N of the tree.

Each set $SK_j$ of private keys may be composed of ($sk_{j1}$, $sk_{j2}$, . . . , $sk_{jt}$), and each set $PK_j$ of public keys may be composed of ($pk_{j1}$, $pk_{j2}$, . . . , $pk_{jt}$). For t representing the size of a key set and i representing a sequence ranging from 1 to t, an individual private key $sk_{ji}$ is a set of 0s or 1s, having a length of $\ell$ and, for example, may be, but is not limited to, a binary number sequence of length $\ell..$ The $sk_{ji}$ may be randomly selected from a mathematically uniform set. Also, an individual public key $pk_{ji}$ may correspond to $H^b(sk_{ji})$.

As shown in FIG. 15, $\{h_1, h_2, \ldots, h_{2^N}\}$ obtained by applying the compression function $\hat{H}$ to each public key set $PK_j$ belonging to the OTS/FTS public key group $\{PK_1, PK_2, \ldots, PK_{2^N}\}$ composed of public keys originating from at least one key pair may be assigned to the leaf node of the hash tree. Also, $H(A\|B)$ obtained by concatenating result values assigned to two lower nodes A, B and applying a hash function again to the merged value is assigned to each of the inner nodes of the hash tree. At this time, like the description given with reference to FIG. 4 above, the concatenation operator "$\|$" may employ any operation as long as the employed operation derives a unique calculation result value through a merging of two values placed before and after the operator; preferably, an operation of a simple concatenation of two values may be applied. However, in addition to the specific example above, the concatenation operator may employ addition, subtraction, bit-wise AND operation, OR operation, XOR operation, shift operation, or a merging function combining one or more of the listed operations, other logical operations, or mathematical operations; it is obvious that those skilled in the art may select various other methods in addition to the above.

Ultimately, $h_{18}$, which lies at the apex of the tree, becomes the root node rPK and the expanded public key, and the extended public key may be distributed to all verifiers in advance.

In what follows, a signature generation step will be described. FIG. 15 illustrates a tree-based extended electronic signature method when N=3, where electronic signatures may be generated for $2^N=8$ messages ($m_1$, $m_2$, . . . , $m_8$). For example, an OTS/FTS key pair ($PK_1$, $SK_1$) may be applied to the message $m_1$, and an electronic signature for the message $m_1$ may be generated by the operation of Eq. 7 with j=1 using the OTS/FTS private key $SK_1$. Also, verification of the electronic signature for the generated message $m_1$ may be performed by the operation of Eq. 8 with j=1 using the OTS/FTS public key $PK_1$.

Therefore, when the extended electronic signature method transmits a message m, by attaching an electronic signature, the time index j of the message, the message m, the electronic signature data of the message generated using Eq. 7, a public key corresponding to the electronic signature data, and a verification value authP composed of N verification values (e.g., 3) originating from the hash tree may also be transmitted to a verifier. For example, for the message $m_1$, information in the form of Eq. 9 may be transmitted.

$$[j=1,m_1,SIG_{SK_1}(H(m_1)),authP_1=\{h_2,h_{34},h_{58}\}] \qquad \text{[Eq. 9]}$$

At this time, the verification value $authP_1$ of Eq. 9 may be a set of sibling nodes used to constitute nodes ($\{h_1, h_{12}, h_{14}, h_{18}\}$) on the tree path from the leaf node $h_1$ corresponding to the message $m_1$ to the root node $h_{18}$. Therefore, the OTS/FTS public key $PK_1$ and rPK ($=h_{18}$), which is the extended public key, are related as shown in Eq. 10 below, through which it may be verified that the current OTS/FTS public key is valid for the extended public key.

$$rPK(=h_{18})=H(H(H(\hat{H}(PK_1)\|h_2)\|h_{34})\|h_{58}) \qquad \text{[Eq. 10]}$$

In what follows, the signature verification step will be described. The verifiers who have received the extended public key rPK ($=h_{18}$) in advance may first verify the validity of the current OTS/FTS public key PK1 for the extended public key rPK ($=h_{18}$) using the relationship of Eq. 10 for verification of the electronic signature of the message $m_1$. When the validity is verified, the validity of the signature $SIG_{SK_1}$ may be verified according to the method $VER_{PK_1}$ of Eq. 8 using the $PK_1$.

In the same way as described above, messages $m_2$ to $m_8$ may be electronically signed and verified. The electronic signatures for the respective messages may be expressed by Eq. 11.

$$[j=2,m_2,SIG_{SK_2}(H(m_2)),authP_2=\{h_1,h_{34},h_{58}\}]$$

$$[j=3,m_3,SIG_{SK_3}(H(m_3)),authP_3=\{h_4,h_{12},h_{58}\}]$$

$$[j=4,m_4,SIG_{SK_4}(H(m_4)),authP_4=\{h_3,h_{12},h_{58}\}]$$

$$[j=5,m_5,SIG_{SK_5}(H(m_5)),authP_5=\{h_6,h_{78},h_{14}\}]$$

$$[j=6,m_6,SIG_{SK_6}(H(m_6)),authP_6=\{h_5,h_{78},h_{14}\}]$$

$$[j=7,m_7,SIG_{SK_7}(H(m_7)),authP_7=\{h_8,h_{56},h_{14}\}]$$

$$[j=8,m_8,SIG_{SK_8}(H(mg)),authP_8=\{h_7,h_{56},h_{14}\}] \qquad \text{[Eq. 11]}$$

As described above, when using a Merkle tree with a depth or height of N, it is possible to apply electronic signatures to $2^N$ messages by generating up to $2^N$ OTS/FTS key pairs for one extended public key rPK. However, the tree-based electronic signature methods described above may have the following limitations.

First, since the number of available OTS/FTS key pairs is finite according to the set tree height, the number of messages that may be signed may also be finite. Therefore, after using up all the key pairs, a new Merkle tree has to be constructed, and a newly derived extended public key has to be securely distributed to all verifiers. A separate security mechanism may be required for secure distribution as described above.

Second, the length of a signed message may be long. In other words, the number of hash values $|authP_j|$ that should be included in the verification value relating the OTS/FTS public key to the extended public key increases as the tree height increases. For example, if N is 20, $|authP_j|$ also becomes 20.

Third, an initial operation for pre-distributing the extended public key to verifiers may be relatively complex. For example, $2^N$ OTS/FTS key pairs may have to be generated in advance; (t−1) H(.) operations may have to be processed for calculating the compression function $\tilde{H}(PK_j)=h_j$, which is a leaf node value for each OTS/FTS public key $\{PK_1, PK_2, \ldots, PK_{2^N}\}$ (at this time, the $PK_j$ may be composed of individual public keys ($pk_{j1}$, $pk_{j2}$, . . . , $pk_{jt}$)); and ($2^N$−1) H(.) operations may be further required to derive the inner nodes. Therefore, to derive the initial extended public key, a total of $2^N \cdot (t-1)+(2^N-1)=2^N \cdot t-1$ H(.) operations may be required. For example, according to the embodiment, when N=20, and t=28, the number of H(.) operations becomes 5,120.

Disclosure of the Proposed HBS Extended Algorithm

The present disclosure proposes a new extended electronic signature method capable of supplementing the limitations of the existing tree-based electronic signature method. In the method according to one embodiment of the present disclosure, an infinite hash chain is used instead of a tree (the method may include a method disclosed in "One-time password based on hash chain without shared secret and re-registration," Computers & Security, vol. 75, pp. 138-146, June 2018 and/or a method disclosed in Korean Registered Patent Publication No. 2020111). The infinite hash chain of the present disclosure improves the limitation of the finite length hash chain according to the prior art (refer to the method disclosed in L. Lamport, "Password authentication with insecure communication," Communications of the ACM, vol. 24, no. 11, pp. 770-772, November 1981.), namely, that the length of the hash chain is finite, and the infinite hash chain according to the present disclosure may be utilized as cryptographic primitives for designing a One-Time Password (OTP) method that may be used infinitely.

When the infinite hash chain method according to the present disclosure is used as primitives of an extended electronic signature method, the following advantageous effects may be obtained: first, there is no limit to the number of times OTS/FTS is used; second, the length of a signed message is always kept constant; third, unlike the tree-based electronic signature method, the operational cost for the initial operation and signature generation is low; and fourth, a separate security mechanism for continually updating the expanded public key is not required. In other words, as the OTS/FTS electronic signature is generated and verified for each message, the extended public key may be automatically and securely updated.

Figure 17:
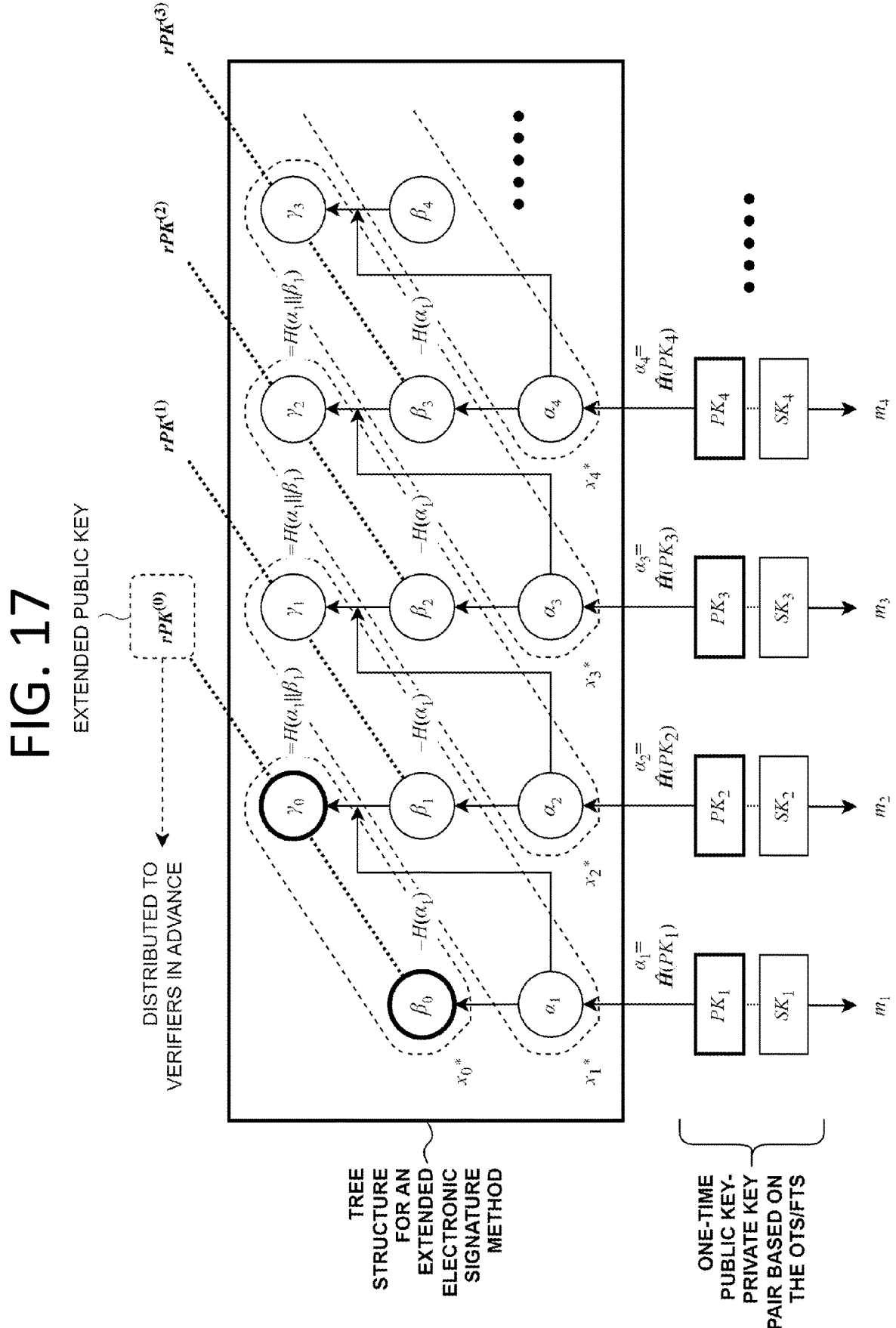
FIG. 17 illustrates an extended electronic signature method based on an infinite hash chain according to one embodiment of the present disclosure.

FIG. 17 illustrates an extended electronic signature method based on an infinite hash chain according to one embodiment of the present disclosure. First, design principles of an infinite hash chain used as a primitive of an extended electronic signature and utilization of the infinite hash chain for an OTP will be described.

In the case of an infinite hash chain, a finite hash chain having a length of n is generated by continually applying a cryptographic hash function H(.) as expressed in Eq. 5 based on a seed value $x_n$ which may be a set of $\{0, 1\}$ having a length of a natural number $\ell$. The generation of the finite hash chain may be expressed by Eq. 12 below.

$$\{x_j|x_j=H(x_{j+1}) \text{ for } j \in [0,n-1]\}=\{x_0,x_1,x_2, \ldots ,x_n\} \qquad \text{[Eq. 12]}$$

When the finite hash chain is used as an OTP, a sender (which may be referred to as a prover) sending a message with an electronic signature registers $x_0$ of the finite hash chain to a verifier in advance, after which the sender may use $x_1$ to $x_n$ sequentially as an OTP. In using the OTP, when the sender arbitrarily transmits the j-th OTP, $x_j$, to the verifier, the verifier may verify that $x_{j-1}=H(x_j)$ based on the previously registered $x_{j-1}$ and check the validity of OTP $x_j$. The verifier may be configured to wait for the next OTP after replacing $x_{j-1}$ with $x_j$ for the registered value. In the above method, the number of times the OTP is used is limited to n defined in Eq. 12 above.

On the other hand, when the infinite hash chain according to the present disclosure is used as an OTP, it is possible to generate, use, and verify the OTP without a limit as shown in FIG. 17. First, a seed value ($\alpha_1$, $\alpha_2$) may be obtained, where $\alpha_j$ may be a set of $\{0, 1\}$ having a length of a natural number $\ell$, and j may be an arbitrary, unbounded number greater than or equal to 1. Next, based on the seed value, $x^*_o=(\beta_0, \gamma_0)$ may be derived, where $\beta_0=H(\alpha_1)$ and $\gamma_0=H(\alpha_1\|H(\alpha_2))$. From the derivation above, $\alpha_3$, $\alpha_4$, and so on are generated sequentially to derive $x_1=(\alpha_1, \beta_1, \gamma_1)$, $x_2=(\alpha_2, \beta_2, \gamma_2)$, $x_3=(\alpha_3, \beta_3, \gamma_3)$, and so on.

The sender registers $x^*_0$ to the verifier in advance and sequentially uses $x_1$, $x_2$, $x_3$, and so on as an OTP. When the sender transmits $x_j=(\alpha_j, \beta_j, \gamma_j)$ to the verifier as the j-th OTP, the verifier may check the validity of the OTP $x_j$ by verifying based on the previously registered $x^*_{j-1}=(\beta_{j-1}, \gamma_{j-1})$ that $\beta_{j-1}=H(\alpha_j)$ and $\gamma\_(j-1)=H(\alpha_j\|\beta_j)=H(\alpha\_j\|H(\alpha\_(j+1)))$. Accordingly, the verifier may be configured to replace the pre-stored $x^*_{j-1}$ with $x^*_j(\beta_j, \gamma_j)$ and wait for the next OTP to be received. According to the procedure above, since there is no limit on the number of OTPs, $x_1$, $x_2$, $x_3$, and so on derived sequentially, the OTP may be generated, used, and verified repeatedly without a limit.

In what follows, an extended electronic signature method based on an infinite hash chain will be described step by step. To use the infinite hash chain in the extended electronic signature method, according to one embodiment of the present disclosure, $\alpha_1$, $\alpha_2$, $\alpha_3$, $\alpha_4$, and so on shown in FIG. 17 may be derived using Eq. 13 below. Also, the procedure of Eq. 13 below may be performed each time an arbitrary j-th OTS/FTS key pair $(PK_j, SK_j)$ is generated.

$$\alpha_j = \hat{H}(PK_j) \text{ for } j \in [1, \infty] \qquad \text{[Eq. 13]}$$

The extended electronic signature method based on an infinite hash chain according to the present disclosure as shown in FIG. 17 may include initialization, signature generation, and signature verification steps.

In what follows, the initialization step will be described. For the initialization step, a first algorithm depicted in the following pseudo-code may be used.

[First Algorithm: Initialization by Signer]
1: Generate $(PK_1, SK_1)$ and $(PK_2, SK_2)$;
2: $\alpha_1 \leftarrow \hat{H}(PK_1)$; $\alpha_2 \leftarrow H(PK_2)$;
3: $\beta_0 \leftarrow H(\alpha_1)$; $\beta_1 \leftarrow H(\alpha_2)$;
4: $\gamma_0 \leftarrow H(\alpha_1 \| \beta_1)$;
5: $rPK^{(0)} \leftarrow (\beta_0, \gamma_0)$;
6: Predistribute $rPK^{(0)}$ securely to verifiers;
7: Store $\{j=1, (PK_1, SK_1), (PK_2, SK_2), (\alpha_1, \alpha_2)\}$;

The root public key $rPK^{(0)} = (\beta_0, \gamma_0)$ derived based on $(\alpha_1, \alpha_2)$ in the initialization step by the first algorithm may be an extended public key according to the present disclosure and may be distributed securely to verifiers in advance. In the present disclosure, a characteristic feature of the extended public key is that $rPK^{(j)}$ may be updated indefinitely whenever the OTS/FTS uses an arbitrary j-th electronic signature.

In what follows, the signature generation step will be described. According to one embodiment of the present disclosure, an OTS/FTS key pair $(PK_j, SK_j)$ may be applied to an arbitrary j-th message $m_j$, to which an electronic signature is to be applied. $SIG_{SK_j}(H(m_j \| \gamma_j))$, which is an OTS/FTS electronic signature for the message $m_j$, may be generated using the OTS/FTS private key $SK_j$. Also, the OTS/FTS public key $PK_j$ may be used to verify the electronic signature, namely, to determine true/false of $VER_{PK_j}(m_j \| \gamma_j, SIG_{SK_j}(H(m_j \| \gamma_j)))$. At this time, $\gamma_j$ may be used to renew the extended public key $rPK^{(j-1)}$ currently maintained by the verifiers by relating the $rPK^{(j-1)}$ to $rPK^{(j)}$ and may perform the role of ensuring integrity in the renewal process. For example, for an arbitrary message $m_j$, information in the form of Eq. 14 below may be generated and transmitted to the verifiers.

$$[j, m_j, SIG_{SK_j}(H(m_j \| \gamma_j)), authP_j = \{\beta_j, \gamma_j\}] \text{ for } j \in [1, \infty]$$

At this time, the verification value of Eq. 9, $authP_j = \{\beta_j, \gamma_j\}$, relates the current OTS/FTS public key $PK_j$ and the extended public key $rPK^{(j-1)} = (\beta_{j-1}, \gamma_{j-1})$ as shown in Eq. 15 below, along with $\alpha_j = \hat{H}(PK_j)$, through which it is verified that the current OTS/FTS public key is valid for the extended public key.

$$\beta_{j-1} = H(\alpha_j) \text{ and } \gamma_{j-1} = H(\alpha_j \| \beta_j), \text{ where } \alpha_j = \hat{H}(PK_j)$$

For the electronic signature generation step by the signer, a second algorithm depicted in the following pseudo-code may be used.

[Second Algorithm: Signature Generation by Signer]
Input: $m_j$ and $\{j, (PK_j, SK_j), (PK_{j+1}, SK_{j+1}), (\alpha_j, \alpha^{j+1})\}$ for $j \in [1, \infty]$ Output: $[j, m_j, SIG_{SK_j}(H(m_j \| \gamma_j)), PK_j, authP_j = \{\beta_j, \gamma_j\}]$
1: Generate $(PK_{j+2}, SK_{j+2})$;
2: $\alpha_{j+2} \leftarrow \hat{H}(PK_{j+2})$;
3: $\beta_j \leftarrow H(\alpha_{j+1})$; $\beta_{j+1} \leftarrow H(\alpha_{j+2})$;
4: $\gamma_j \leftarrow H(\alpha_{j+1} \| \beta_{j+1})$;
5: $rPK^{(0)} \leftarrow (\beta_0, \gamma_0)$;
6: Store $\{j+1, (PK_{j+1}, SK_{j+1}), (PK_{j+2}, SK_{j+2}), (\alpha_{j+1}, \alpha^{j+2})\}$;
7: Return $[j, m_j, SIG_{SK_j}(H(m_j \| \gamma_j)), PK_j, authP_j = \{\beta_j, \gamma_j\}]$;

All messages after message $m_1$ may be electronically signed and verified in the same way as described above. For example, Eq. 16 below shows an electronic signature for each message.

$$[j=1, m_1, SIG_{SK_1}(H(m_1 \| \gamma_1)), PK_1, authP_1 = \{\beta_1, \gamma_1\}]$$

$$[j=2, m_2, SIG_{SK_2}(H(m_2 \| \gamma_2)), PK_2, authP_2 = \{\beta_2, \gamma_2\}]$$

$$[j=3, m_3, SIG_{SK_3}(H(m_3 \| \gamma_3)), PK_3, authP_3 = \{\beta_3, \gamma_3\}]$$

FIG. 16 is another conceptual diagram illustrating a data structure of an electronically signed message according to one embodiment of the present disclosure. The embodiment of FIG. 16 shows a structure for transmitting a message with an electronic signature expressed by Eq. 16, which may be generated from Eq. 14. According to the embodiment of FIG. 16, a message 1600 with an electronic signature comprises an original message 1610, electronic signature data 1620, an OTS/FTS public key 1630, and a verification value authP 1640. The verification value may be configured to include at least a first verification factor 1641 $\beta_j$ and a second verification factor 1642 $\gamma_j$. In this regard, FIG. 16 may be interpreted in comparison with the structure for a message with an electronic signature shown in FIG. 2.

In what follows, the signature verification step will be described. The verifiers which have received $rPK^{(j-1)} = (\beta_{j-1}, \gamma_{j-1})$ in advance before transmission of an arbitrary j-th electronic signature may be configured to verify the electronic signature data provided in the form of Eq. 14.

For the electronic signature verification step by the verifier, a third algorithm depicted in the following pseudo-code may be used.

[Third Algorithm: Signature Verification by Verifier]
Input: $[rPK^{(j-1)} = (\beta_{j-1}, \gamma_{j-1}), m_j, SIG_{SK_j}(H(m_j \| \gamma_j)), PK_j, authP_j = \{\beta_j, \gamma_j\}]$ for $j \in [1, \infty]$
Output: verification result (true/false) $[j, m_j, SIG_{SK_j}(H(m_j \| \gamma_j)), PK_j, authP_j = \{\beta_j, \gamma_j\}]$
1: $(\beta^*, \gamma^*) \leftarrow rPK^{(j-1)}$;
2: $\alpha_j \leftarrow \hat{H}(PK_j)$;
3: If $\beta^* \neq H(\alpha_j)$ or $\gamma^* \neq H(\alpha_j \| \beta_j)$, then $\{result \leftarrow \text{"false"}; goto 7;\}$
4: if $VER_{PK_j}(m_j \| \gamma_j, SIG_{SK_j}(H(m_j \| \gamma_j)))$ "false", then $\{result \leftarrow \text{"false"}; goto 7;\}$;
5: $rPK^{(j)} \leftarrow (\beta_j, \gamma_j)$;
6: $result \leftarrow \text{"true"}$;
7: Return "result";

The main contents of the third algorithm above are described as follows.

Step 1: Validity of the current OTS/FTS public key $PK_j$ for the extended public key $rPK^{(j-1)} = (\beta_{j-1}, \gamma_{j-1})$ may be verified using Eq. 15. When the validity of the public key is verified, the algorithm may proceed to the second step. The first step may correspond to the operation of row 3: of the third algorithm.

Step 2: Whether $VER_{PK_j}(m_j \| \gamma_j, SIG_{SK_j}(H(m_j \| \gamma_j)))$ is "true" or "false" may be derived using the public key $PK_j$. When the derivation result of the verification function is "true", the electronic signature is verified, and the algorithm may proceed to the third step. The second step may correspond to the 4: row operation of the third algorithm.

Step 3: The verifier may be configured to replace the extended public key $rPK^{(j-1)}=(\beta_{j-1}, \gamma_{j-1})$ with $rPK^{(j)}=(\beta_j, \gamma_j)$. The third step may correspond to the 5: row operation of the third algorithm.

Effects of Implementing the Algorithm of the Present Disclosure

As described above, the OTS/FTS public key in the basic electronic signature method (OTS/FTS) according to the prior art may be used only once or a few times during a specific period, and a new public key has to be distributed to all verifiers in advance in a way the integrity of the new public key is guaranteed. The extended electronic signature method according to the present disclosure may provide a structure that allows unlimited use of multiple OTS/FTS public keys through the initial distribution (or installation) of the extended public key distribution without introducing a separate additional distribution mechanism.

In the conventional tree-based electronic signature structure, the number of messages that may be electronically signed without updating an extended public key is limited to 2N. On the other hand, according to the extended electronic signature method based on an infinite hash chain according to the present disclosure, a root public key stored as an extended public key may be automatically updated after each signature generation and verification process without introducing a separate mechanism. In other words, it may be understood that a renewal mechanism that guarantees integrity in the signature generation step is built into the signature algorithm. Therefore, according to the present disclosure, it may be configured to generate a message signature an infinite number of times without introducing a separate update and distribution mechanism.

Also, in the tree-based electronic signature method, it was pointed out that when the height of a tree (which may also be referred to as depth) is 3, 5120 hash operations are required to derive an extended public key in the initialization step. In contrast, according to the extended electronic signature method based on an infinite hash chain according to the present disclosure, the number of hash operations required to derive the extended public key is defined as $2\cdot(t-1)+3$ for depth t. Therefore, when the height of the tree is 3, only 513 hash operations are required. Also, since the height of a tree does not affect the number of electronically signed messages, the height of the tree only affects the initialization time. In other words, to adjust the security level, the height of the tree may also be set to an arbitrary height more flexibly. In this case, as in the embodiment previously disclosed with reference to FIG. 13, the verification factor constituting the verification value $authP_j$ may need to be expanded or reduced.

According to one embodiment of the present disclosure, the initialization step may be configured more efficiently by applying an additional algorithm. To derive the extended public key in the initialization step of the tree-based electronic signature method, since $2^N$ OTS/FTS key pairs are generated, and the tree is configured based on the generated key pairs, when all of the node information for the tree is stored to configure the verification value $authP_j$, $\{2^{N+1}\cdot t\cdot \ell +(2^{N+1}-1)\cdot\ell\ \}\div 8$ bytes of storage space is required theoretically. For example, if the height N of the tree is 20, the length t of the key set is $2^8$, and the length $\ell$ of each key is 256, approximately 17 gigabytes of storage space is required.

Therefore, when a tree traversal algorithm based on time-memory compromise, which minimizes storage space and increases computational cost, is utilized (e.g., the algorithm may include the work disclosed in J. Buchmann, E. Dahmen, and M. Schneide, "Merkle Tree Traversal Revisited," PQCrypto 2008: Post Quantum Cryptography, LNCS, volume 5299, pp. 63-78, Springer-Verlag, 2008), to derive $authP_j$ when $authP_{j-1}$ is given, on average, the compression function $\hat{H}(.)$ has to be computed $(N-1)/2$ times to derive leaf nodes, and the hash function $H(.)$ has to be computed $(N-3)/2$ times to derive inner nodes, where $H(.)$ thus has to be computed $(t-1)\cdot(N-1)/2+(N-3)/2$ times in total. Therefore, for example, when the tree height N is 20, and the length t of a set of keys is $2^8$, the number of computations of the hash function $H(.)$ may be reduced to 258.

In one embodiment of the present disclosure, the length of the verification value $authP_j$ (i.e., the number of verification factors included) $|authP_j|$ may be maintained at 2. This feature may be regarded as being different from that of the conventional tree-based electronic signature structure in which the $|authP_j|$ varies in association with the height of the tree. However, the embodiment of the present disclosure is not limited to the specific method; when the tree is expanded, $|authP_j|$ may increase to 3 or more or may be implemented by being combined with a separate verification configuration, as described above with reference to 13 to 14.

In one embodiment of the present disclosure, in deriving all the values used to generate and verify the electronic signature, the corresponding values do not necessarily have to be in a consecutive sequence. For example, in the above embodiment described through the first to third algorithms, to electronically sign the message $m_j$ at the j-th transmission order, the PK, SK, $\alpha$, $\beta$, and $\gamma$ values corresponding to the j-th, (j+1)-th, and (j+2)-th transmission order are used; however, in another embodiment of the present disclosure, values at the j-th, (j+2)-th, and (j+4)-th transmission order may be used. In yet another embodiment of the present disclosure, values at the j-th, (j+1)-th, and (j+5)-th transmission order may be used. In still another embodiment of the present disclosure, values at the j-th, (j+4)-th, and (j+5)-th transmission order may be used. In addition to the above-described examples, if the continual integrity of an infinite hash chain is guaranteed based on the technical principles of the present disclosure, as described above, a method of calculating each value by combining values corresponding to non-consecutive indices may still be applied.

Applicability of Embodiments of the Present Disclosure

An extended electronic signature method based on an infinite hash chain according to the present disclosure or an apparatus or a system configured to utilize the method may be applied to the Internet of Things (IoT) communication environment, especially an industrial IoT environment, in which a continuous relationship is maintained between a signer (i.e., a sender) and verifiers. For example, when a message is transmitted periodically between a user (signer) and a device (verifier) or between a first device (signer) and a second device (verifier) or when a message is repeatedly transmitted whenever a specific event occurs, the extended electronic signature method according to the present disclosure and an apparatus or a system configured to utilize the method may be used to ensure source authentication and message integrity.

The first device may be a device configured to execute the extended electronic signature method based on an infinite hash chain of the present disclosure. The first device may have a processor with a computing function and a memory connected to the processor. Also, the second device may be a device configured to execute the extended electronic signature verification method based on an infinite hash chain according to the present disclosure. The second device may have a processor with a computing function and a memory connected to the processor.

The device above may indicate one or more general-purpose computers or a special-purpose computer like a processor, a controller, an Arithmetic Logic Unit (ALU), a digital signal processor, a microcomputer, a Field Programmable Array (FPA), a Programmable Logic Unit (PLU), a microprocessor, or any other device capable of executing and responding to instructions.

The processor may be configured to execute an operating system (OS) and one or more software applications run on the operating system. Also, the processor may access, store, manipulate, process, and generate data in response to the execution of the software. For the convenience of understanding, even if the processor is expressed in the singular form, it should be understood by those skilled in the art that the processor may include a plurality of processing elements and/or a plurality of processing element types. For example, the processor may include a plurality of processors or one processor and one controller. Also, the processor may be implemented based on various processing configurations such as a parallel processor or a multi-core processor.

The software may include a computer program, code, instructions, or a combination of one or more of the above; and may configure a processor to operate in a desired manner or instruct the processing device independently or collectively. The software may be embodied permanently or temporarily in a particular type of machine, component, physical equipment, virtual equipment, computer storage medium or device, or a transmitted signal wave to be interpreted by the processor or to provide instructions or data to the processor. The software may be distributed over computer systems connected to each other through a network to be stored or executed in a distributed manner.

The software may be implemented in the form of program commands which may be executed through various types of computer means and recorded in the memory. The memory may be a computer-readable recording medium, which may record program commands, data files, and data structures separately or in combination thereof. The program commands stored in the memory may be based on the instruction system designed and configured specifically for the embodiments of the present disclosure or may adopt an instruction system commonly available for those skilled in the field of computer software, such as assembly language, C, C++, Java, or Python. It should be understood that the instruction system and related program commands include not only the machine code such as those generated by a compiler but also the high-level language code which may be executed by a computer through an interpreter and the like.

The computer-readable recording medium constituting the memory may include a transitory or volatile recording medium maintaining content only when the processor is operating, such as a cache, a RAM, and a flash memory; a relatively non-volatile or long-term recording medium such as a magnetic medium including a hard disk, floppy disk, and a magnetic tape, an optical recording medium such as a CD-ROM and a DVD, a magneto-optical medium such as a floptical disk, or a solid state memory; or a read-only recording medium such as a ROM disposed on the hardware. Furthermore, it should be clearly understood by those skilled in the art that the hardware itself configured to perform operations equivalent to a series of program commands in a hard-wired structure using circuit wiring may also be regarded as another type of recording medium storing programs commands for implementing the embodiment of the present disclosure.

The embodiments described above for the processor and the memory are not mutually exclusive and may be implemented by being selected or combined depending on the needs. For example, one hardware device may be configured to be operated by one or more software modules to perform the operations of the present disclosure, and vice versa.

One embodiment of the present disclosure may be applied when a controller sends a control message to a plurality of actuators in a multicast manner for the industrial control system (ICS), which forms the core of the critical infrastructure and the automation of the manufacturing industry. For example, the extended public key derived in the initialization process may be installed in a one-time manner through the commissioning process when devices such as actuators used in the above environment are deployed in the field.

One embodiment of the present disclosure may be applied to update the firmware of IoT devices. For example, the firmware initially distributed includes a software module for the firmware update, where the software module may be configured to include the extended public key. When new firmware is distributed together with metadata, the metadata may be electronically signed by the software developer, and the electronic signature method according to the present disclosure may be used for the electronic signature. The metadata may be verified using the extended public key stored in the device and may be configured to guarantee the integrity of the updated firmware and device and update the extended public key.

Also, in addition to the specific embodiments described above, the present disclosure may be implemented by a software method or a computing device provided for various purposes or functions; the present disclosure may be modified and utilized in various ways to support the method or device.

What is claimed is:

1. A method for generating a message with an electronic signature using a computing device, the method comprising:
   obtaining a message to be electronically signed;
   generating a public key and a private key by a key generation algorithm;
   generating at least one alpha-verification factor;
   generating at least one beta-verification factor;
   generating at least one gamma-verification factor;
   storing the at least one public key, the at least one private key, and the at least one alpha-verification factor in the memory of the computing device;
   generating electronic signature data based on the message and the private key;
   generating at least one verification factor for verifying integrity of the electronic signature data;
   generating a verification value including at least one of the verification factors; and
   generating an electronically signed message including the message, the electronic signature data, the public key, and the verification value, wherein
   the generating the electronic signature data includes generating the electronic signature data based on the message, the at least one alpha-verification factor, the at least one beta-verification factor, and the at least one gamma-verification factor, and the at least one verification factor includes the at least one beta-verification factor and the at least one gamma-verification factor.

2. The method of claim 1, including:

identifying transmission order x of the message;

defining transmission order y greater than the transmission order x and transmission order z greater than the transmission order x and different from the transmission order y;

retrieving, from the memory of the computing device, the public key $PK_x$ of the transmission order x, the private key $SK_x$ of the transmission order x, the public key $PK_y$ of the transmission order y, the private key $SK_y$ of the transmission order y, the alpha-verification factor $\alpha_x$ of the transmission order x, and the alpha-verification factor $\alpha_y$ of the transmission order y;

obtaining a message $m_x$ of the transmission order x to be electronically signed;

generating the public key $PK_z$ of transmission order z and the private key $SK_z$ of the transmission order z;

generating the alpha-verification factor $\alpha_z$ of the transmission order z based on the $PK_z$;

generating the beta-verification factor $\beta_x$ of the transmission order x based on the $\alpha_y$;

generating the beta-verification factor $\beta_y$ of the transmission order y based on the $\alpha_z$;

generating the gamma-verification factor $\gamma_x$ of the transmission order x based on the $\alpha_y$ and the $\beta_y$;

generating the electronic signature data $SIG_x$ of the transmission order x based on the $m_x$, the $\gamma_x$, and the $SK_x$;

generating the verification value $authP_x$ of the transmission order x based on the $\beta_x$ and the $\gamma_x$;

generating an electronically signed message of the transmission order x including the $m_x$, the $SIG_x$, the $PK_x$, and the $authP_x$; and storing the $PK_y$, the $SK_y$, the $PK_z$, the $SK_z$, the $\alpha_y$, and the $\alpha_z$ in the memory of the computing device.

3. The method of claim 2, wherein the $\alpha_z$ is generated based on $\hat{H}(PK_z)$, which is a value obtained by applying a compression operation $\hat{H}$ to the $PK_z$, and the compression operation $\hat{H}$ is performed by an operation including a function operation that receives a binary number sequence with a first length and outputs a binary number sequence with a second length shorter than the first length.

4. The method of claim 2, wherein the $\beta_x$ is generated based on the value $H(\alpha_y)$ obtained by applying a hash operation H to the $\alpha_y$, the $\beta_y$ is generated based on the value $H(\alpha_z)$ obtained by applying a hash operation H to the $\alpha_z$, and the hash operation H is performed by an operation including a collision-resistant hash function operation that receives a binary number sequence with an arbitrary length and outputs a binary number sequence with a third length.

5. The method of claim 2, wherein the $\gamma_x$ is generated based on the value $H(a_y\|\beta_y)$ obtained by applying the hash operation H to the value obtained by applying a merge operation $\|$ to the $\alpha_y$ and the $\beta_y$, the $SIG_x$ is generated by applying the hash operation H to the value obtained by applying the merge operation $\|$ to the $m_x$ and the $\gamma_x$ and encrypting a private key using the $SK_x$, the hash operation H is performed by an operation including the collision-resistant hash function operation that receives a binary number sequence with an arbitrary length and outputs a binary number sequence with the third length, and the merge operation $\|$ is performed by an operation including a function operation that concatenates two binary number sequences with an arbitrary length.

6. The method of claim 1, further including initializing the computing device, wherein the initializing includes:

generating at least one initial public key and at least one initial private key using the key generation algorithm;

generating at least one initial alpha-verification factor;

generating at least one beta-verification factor;

generating at least one initial gamma-verification factor;

generating an initial root public key based on the at least one beta-verification factor and the at least one gamma-verification factor; and storing the at least one initial public key, the at least one initial private key, and the at least one alpha-verification factor in the memory of the computing device.

7. The method of claim 6, including:

defining transmission order at an initialization time as x;

defining transmission order y greater than the transmission order x and transmission order z greater than the transmission order x and different from the transmission order y;

generating a public key $PK_y$ of the transmission order y and a private key $SK_y$ of the transmission order y;

generating the public key $PK_z$ of the transmission order z and the private key $SK_z$ of the transmission order z;

generating the alpha-verification factor $\alpha_y$ of the transmission order y based on the $PK_y$;

generating the alpha-verification factor $\alpha_z$ of the transmission order z based on the $PK_z$;

generating the beta-verification factor $\beta_x$ of the transmission order x based on the $\alpha_y$;

generating the beta-verification factor $\beta_y$ of the transmission order y based on the $\alpha_z$;

generating the gamma-verification factor $\gamma_x$ of the transmission order x based on a value obtained by merging the $\alpha_y$ and $\beta_y$;

generating the initial root public key $rPK^{(0)}$ based on the $\beta_x$ and the $\gamma_x$; and storing the $PK_y$, the $SK_y$, the $PK_z$, the $SK_z$, the $\alpha_y$, and the $\alpha_z$ in the memory of the computing device.

8. The method of claim 6, wherein the $\alpha_y$ is generated based on $\hat{H}(PK_y)$ obtained by applying compression operation $\hat{H}$ to the $PK_y$;

the $\alpha_z$ is generated based on $\hat{H}(PK_z)$ obtained by applying compression operation A to the $PK_z$;

the $\beta_x$ is generated based on $H(\alpha_y)$ obtained by applying hash operation H to the $\alpha_y$;

the $\beta_y$ is generated based on $H(\alpha_z)$ obtained by applying hash operation H to the $\alpha_z$;

the $\gamma_x$ is generated by $H(\alpha_y\|\beta_y)$ obtained by applying hash operation H to the value obtained by applying merge operation $\|$ to the $\alpha_y$ and the $\beta_y$;

the compression operation $\hat{H}$ is performed by an operation including a function operation that receives a binary number sequence with a first length and outputs a binary number sequence with a second length shorter than the first length;

the hash operation H is performed by an operation including a collision-resistant hash function operation that receives a binary number sequence with an arbitrary length and outputs a binary number sequence with a third length; and the merge operation ‖ is performed by an operation including a function operation that concatenates two binary number sequences with an arbitrary length.

9. The method of claim 2, wherein the transmission order y has a value of x+1, and the transmission order z has a value of x+2.

10. A computing device for generating an electronically signed message by a method disclosed in claim 1, the device comprising:

a processor having a computing function;

a memory connected to the processor;

an input unit receiving a message to be electronically signed;

a key generation unit generating a pair of a public key and a secret key using a key generation algorithm;

an electronic signature unit generating electronic signature data based on the message and the private key, generating at least one verification factor for verifying the integrity of the electronic signature data, and generating a verification value including at least one from among the verification factors; and an output unit outputting an electronically signed message including the message, the electronic signature data, the public key, and the verification value.

\* \* \* \* \*